US012706912B1

(12) United States Patent
Hultine

(10) Patent No.: US 12,706,912 B1
(45) Date of Patent: Aug. 11, 2026

(54) DYNAMIC CENTRALIZED ACCESS LIST/FIREWALL MANAGEMENT

(71) Applicant: Charter Communications Operating, LLC, St. Louis, MO (US)

(72) Inventor: Bradley Hultine, Centennial, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 651 days.

(21) Appl. No.: 17/966,790

(22) Filed: Oct. 15, 2022

(51) Int. Cl.
*H04L 9/40* (2022.01)

(52) U.S. Cl.
CPC ........ *H04L 63/101* (2013.01); *H04L 63/0263* (2013.01)

(58) Field of Classification Search
CPC ..... H04W 12/06; H04W 12/04; H04W 12/02; H04W 12/08; H04W 84/12; H04W 36/14; H04W 48/18; H04W 4/80; H04W 88/06; H04W 88/08; H04W 12/003; H04L 67/141; H04L 63/0428; H04L 63/08; H04L 67/14; H04L 67/143; H04L 43/0864; H04L 12/66; H04L 9/3236; H04L 63/101; H04L 63/0263; H04M 15/66; H04M 15/00; G06F 11/3051; G06F 21/44; G06F 3/0622; G06F 3/0659; G06F 21/31
USPC .......... 726/27, 2, 21, 36; 713/150, 163, 181; 380/255, 264, 276
See application file for complete search history.

(56) References Cited

U.S. PATENT DOCUMENTS

| | | | | |
|---|---|---|---|---|
| 7,792,963 B2 * | 9/2010 | Gould | H04N 7/163 709/225 |
| 9,104,865 B2 * | 8/2015 | Seacat Deluca | G06F 21/554 |
| 2003/0056217 A1 * | 3/2003 | Brooks | H04N 7/17318 348/E7.071 |
| 2004/0103282 A1 * | 5/2004 | Meier | H04L 9/0891 713/171 |
| 2005/0198247 A1 * | 9/2005 | Perry | H04L 41/22 709/223 |
| 2006/0130107 A1 * | 6/2006 | Gonder | H04N 21/2393 725/111 |
| 2006/0149962 A1 * | 7/2006 | Fountain | H04L 9/0897 713/151 |

(Continued)

OTHER PUBLICATIONS

Wikipedia, Access-control list, 6 Pages downloaded Feb. 5, 2026 from https://web.archive.org/web/20221014065532/https://en.wikipedia.org/wiki/Access-control_list Snapshot Date Oct. 14, 2022.

(Continued)

*Primary Examiner* — Sharif E Ullah
(74) *Attorney, Agent, or Firm* — Otterstedt & Kammer PLLC

(57) ABSTRACT

For a communications network having a plurality of network security elements and a plurality of existing network security element specification files which limit packet flow on the network security elements, obtain, from a user, instructions to compose at least one of: a new network security element specification file; or one of the existing network security element specification files. Facilitate queuing a configuration change request that implements the instructions in an implementation pipeline. Facilitate pushing the configuration change request to at least one corresponding network security element of the plurality of network security elements.

34 Claims, 14 Drawing Sheets

(56) References Cited

U.S. PATENT DOCUMENTS

| | | | | |
|---|---|---|---|---|
| 2006/0242711 | A1* | 10/2006 | Anzai | G06F 21/577 726/25 |
| 2007/0101418 | A1* | 5/2007 | Wood | G06F 21/41 726/8 |
| 2007/0136807 | A1* | 6/2007 | DeLiberato | G06F 21/575 726/1 |
| 2007/0168311 | A1* | 7/2007 | Genty | G06N 3/02 706/15 |
| 2007/0217436 | A1* | 9/2007 | Markley | H04N 21/4367 370/401 |
| 2008/0089516 | A1* | 4/2008 | Cocchi | H04N 7/163 375/E7.009 |
| 2008/0273706 | A1* | 11/2008 | Noll | H04L 63/06 380/279 |
| 2009/0248794 | A1* | 10/2009 | Helms | H04L 65/612 709/203 |
| 2010/0082991 | A1* | 4/2010 | Baldwin | H04L 9/083 380/278 |
| 2010/0313236 | A1* | 12/2010 | Straub | H04N 21/27 725/148 |
| 2011/0154443 | A1* | 6/2011 | Thakur | G06F 21/41 726/3 |
| 2012/0003958 | A1* | 1/2012 | Hossain | H04W 12/08 455/411 |
| 2012/0179904 | A1* | 7/2012 | Dunn | G06F 21/575 713/155 |
| 2013/0173900 | A1* | 7/2013 | Liu | G06F 9/45558 713/2 |
| 2014/0279768 | A1* | 9/2014 | Rash | H04L 63/1425 706/14 |
| 2014/0280889 | A1* | 9/2014 | Nispel | H04L 63/20 709/224 |
| 2014/0282480 | A1* | 9/2014 | Matthew | G06F 8/65 717/172 |
| 2015/0003614 | A1* | 1/2015 | Cocchi | H04N 21/2541 380/281 |
| 2015/0121452 | A1* | 4/2015 | Koizumi | G06F 21/57 726/1 |
| 2015/0205965 | A1* | 7/2015 | Kilgallon | G06F 21/554 726/25 |
| 2015/0220710 | A1* | 8/2015 | Cherubini | G06F 21/57 726/19 |
| 2015/0223068 | A1* | 8/2015 | Thelen | H04W 12/069 726/7 |
| 2016/0078229 | A1* | 3/2016 | Gong | G06F 21/577 726/24 |
| 2016/0164918 | A1* | 6/2016 | Satish | H04L 63/0236 |
| 2016/0350535 | A1* | 12/2016 | Garcia | G06F 21/572 |
| 2017/0324758 | A1* | 11/2017 | Hart | H04L 63/0428 |
| 2017/0353983 | A1* | 12/2017 | Grayson | H04W 12/06 |
| 2018/0343118 | A1* | 11/2018 | Funayama | H04L 9/0866 |
| 2019/0182294 | A1* | 6/2019 | Rieke | H04L 63/1433 |
| 2020/0117776 | A1* | 4/2020 | de Souza | H04L 63/0884 |

OTHER PUBLICATIONS

Wikipedia, Router (computing), 10 Pages downloaded Feb. 5, 2026 from https://web.archive.org/web/20220922093532/https://en.wikipedia.org/wiki/Router_(computing) Snapshot Date Sep. 22, 2022.

Wikipedia, Fully qualified domain name, 3 Pages downloaded Feb. 5, 2026 from https://web.archive.org/web/20221014121853/https://en.wikipedia.org/wiki/Fully_qualified_domain_name Snapshot Date Oct. 14, 2022.

Wikipedia, Database, 24 Pages downloaded Feb. 5, 2026 from https://web.archive.org/web/20221012024328/https://en.wikipedia.org/wiki/Database Snapshot Date Oct. 12, 2022.

Wikipedia, User interface, 15 Pages downloaded Feb. 5, 2026 from https://web.archive.org/web/20221011150703/https://en.wikipedia.org/wiki/User_interface Snapshot Date Oct. 11, 2022.

Wikipedia, API, 16 Pages downloaded Feb. 5, 2026 from https://web.archive.org/web/20221014181021/https://en.wikipedia.org/wiki/API Snapshot Date Oct. 14, 2022.

Wikipedia, Version control, 12 Pages downloaded Feb. 5, 2026 from https://web.archive.org/web/20221012061102/https://en.wikipedia.org/wiki/Version_control Snapshot Date Oct. 12, 2022.

Wikipedia, Configuration management, 11 Pages downloaded Feb. 5, 2026 from https://web.archive.org/web/20221013225106/https://en.wikipedia.org/wiki/Configuration_management Snapshot Date Oct. 13, 2022.

Wikipedia, IP address, 13 Pages downloaded Feb. 5, 2026 from https://web.archive.org/web/20221014204140/https://en.wikipedia.org/wiki/IP_address Snapshot Date Oct. 14, 2022.

Wikipedia, Firewall (computing), 5 Pages downloaded Feb. 5, 2026 from https://en.wikipedia.org/wiki/Firewall_%28computing%29 Snapshot Date Oct. 12, 2022.

Firewalld. org, documentation, configuration, 2 Pages downloaded Feb. 5, 2026 from https://web.archive.org/web/20220530030742/https://firewalld.org/documentation/configuration/firewalld-conf.html Snapshot Date May 30, 2022.

Wikipedia, Network security, 4 Pages downloaded Feb. 5, 2026 from https://web.archive.org/web/20221013131530/https://en.wikipedia.org/wiki/Network_security Snapshot Date Oct. 13, 2022.

Wikipedia, Frontend and backend, 4 Pages downloaded Feb. 5, 2026 from https://web.archive.org/web/20220811185407/https://en.wikipedia.org/wiki/Frontend_and_backend Snapshot Date Aug. 11, 2022.

Wikipedia, Pipeline (software), 4 Pages downloaded Feb. 5, 2026 from https://web.archive.org/web/20220918063620/https://en.wikipedia.org/wiki/Pipeline_(software) Snapshot Date Sep. 18, 2022.

Cisco Firepower 4100 Series Firewalls product overview, Snapshot Date Oct. 6, 2022, 11 pages downloaded Feb. 5, 2026 from https://web.archive.org/web/20221006071902/https://www.cisco.com/c/en/us/support/security/firepower-4100-series/series.html.

Wikipedia, Web application, 4 Pages downloaded Feb. 5, 2026 from https://web.archive.org/web/20221011150715/https://en.wikipedia.org/wiki/Web_application Snapshot Date Oct. 11, 2022.

Wikipedia, Web browser, 6 Pages downloaded Feb. 5, 2026 from https://web.archive.org/web/20221010180953/https://en.wikipedia.org/wiki/Web_browser Snapshot Date Oct. 10, 2022.

* cited by examiner

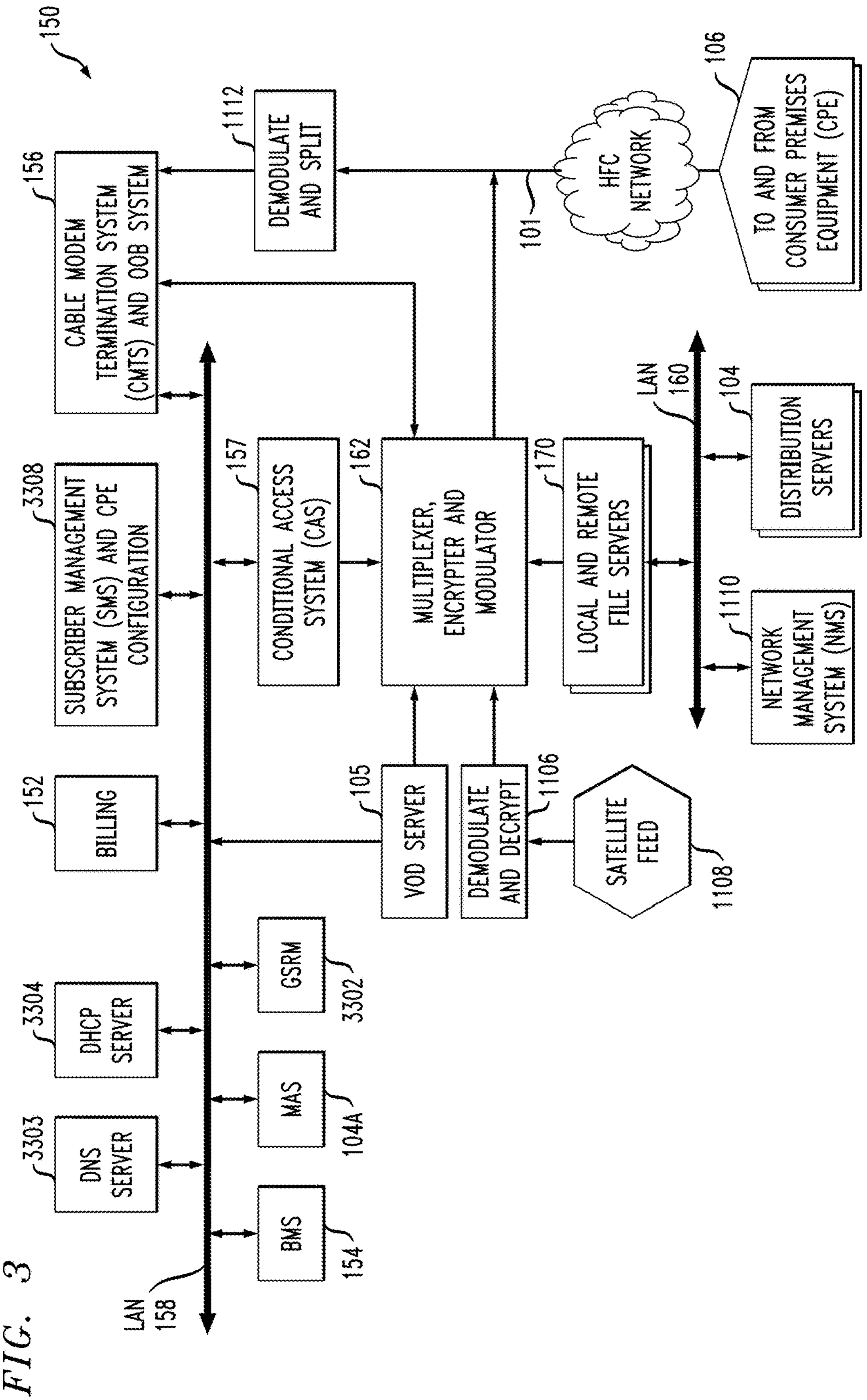

FIG. 3
150
CABLE MODEM TERMINATION SYSTEM (CMTS) AND OOB SYSTEM
156
DEMODULATE AND SPLIT
1112
HFC NETWORK
101
TO AND FROM CONSUMER PREMISES EQUIPMENT (CPE)
106
SUBSCRIBER MANAGEMENT SYSTEM (SMS) AND CPE CONFIGURATION
3308
CONDITIONAL ACCESS SYSTEM (CAS)
157
MULTIPLEXER, ENCRYPTER AND MODULATOR
162
LOCAL AND REMOTE FILE SERVERS
170
LAN 160
DISTRIBUTION SERVERS
104
NETWORK MANAGEMENT SYSTEM (NMS)
1110
BILLING
152
VOD SERVER
105
DEMODULATE AND DECRYPT
1106
SATELLITE FEED
1108
GSRM
3302
DHCP SERVER
3304
MAS
104A
DNS SERVER
3303
BMS
154
LAN 158

101
150
MEM
162
OPTICAL TRANSCEIVER
177
FIBER NETWORK
FIBER NODE
178
CABLE NETWORK
180
LOCAL SERVICE NODE (1)
LOCAL SERVICE NODE (2)
LOCAL SERVICE NODE (n)
182
CPE 1
CPE 2
CPE n
106

106
304
ETHERNET
312
310
MEMORY
316
VIDEO INTERFACE
314
POTS/PSTN INTERFACE
302
Wi-Fi
$SSID_1$, ... $SSID_m$
308
STORAGE
318
PnP INTERFACE
306
μPROCESSOR
301
RF FRONT END
391
MoCA INTERFACE

802
L3 NETWORK
804
HEAD END
806
ACCESS ROUTER
DWDM
808
810
PRIM. DIST. CABINET
812
OLT
1F
814
816
SEC. DIST. CABINET
818
1X64
1F
820-1
1F
820-2
1F
820-64
S-ONU
822-1
S-ONU
822-2
S-ONU
822-64

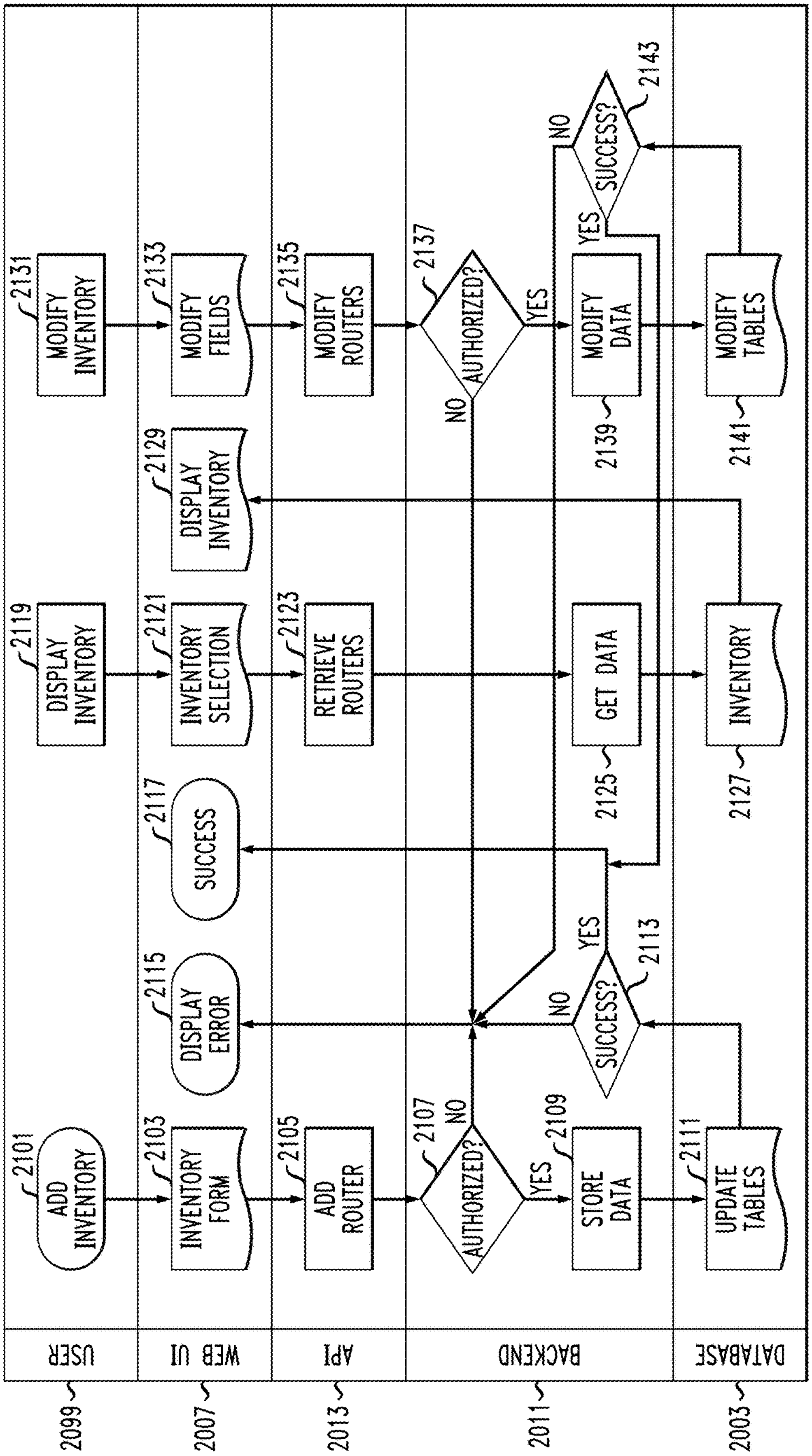

FIG. 11

2099 USER
2007 WEB UI
2013 API
2011 BACKEND
2003 DATABASE
ADD INVENTORY 2101
INVENTORY FORM 2103
ADD ROUTER 2105
AUTHORIZED? 2107
NO
YES
STORE DATA 2109
UPDATE TABLES 2111
SUCCESS? 2113
NO
YES
DISPLAY ERROR 2115
SUCCESS 2117
DISPLAY INVENTORY 2119
INVENTORY SELECTION 2121
RETRIEVE ROUTERS 2123
2125 GET DATA
2127 INVENTORY
DISPLAY INVENTORY 2129
MODIFY INVENTORY 2131
MODIFY FIELDS 2133
MODIFY ROUTERS 2135
AUTHORIZED? 2137
NO
YES
2139 MODIFY DATA
2141 MODIFY TABLES
SUCCESS? 2143
YES
NO

2099 USER
2007 WEB UI
2013 API
2011 BACKEND
2003 DATABASE
2015 PIPELINE
NEW ACL REQUEST 2201
ACL FORM 2203
ADD ACL 2205
AUTHORIZED? 2207
YES
NO
CHANGE NEEDED? 2209
YES
NO
STAGE CHANGES 2211
CONFIRM CHANGE FROM USER 2210
YES
NO
DISPLAY ERROR 2213
DISPLAY SUCCESSFUL STAGING 2215
DISPLAY ACLs 2217
ACL SELECTION 2219
GET ACL 2221
GET DATA 2223
ACL TABLES 2225
ACL LIST 2226
MODIFY ACL 2227
ACL LIST 2229
YES
NO
EDIT SELECTED ACL 2231
MODIFY ACL 2232
AUTHORIZED? 2233
YES
NO
COMPLETE CHANGES 2235

2011 BACKEND
2003 DATABASE
2015 IMPLEMENTATION
2005 CONFIGURATION
2001 ROUTER
CHANGE IN QUEUE? 2401
NO
YES
NOTIFY ADMIN 2403
APPROVAL? 2405
NO
YES
PULL JOB FROM QUEUE (DURING MAINT. WINDOW) 2407
GET ROUTER INFO 2409
INVENTORY TABLES 2411
BUILD CONFIG 2413
PUSH CONFIG 2415
CONFIG CHANGE 2417
ERROR? 2419
NO
YES
COMMIT TO VERSION CONTROL 2421
UPDATE DB 2423
ACL TABLES 2425
NOTIFY USERS 2427

DYNAMIC CENTRALIZED ACCESS LIST/FIREWALL MANAGEMENT

FIELD OF THE INVENTION

The present invention relates generally to the electrical, electronic and computer arts, and, more particularly, to access control lists for network routers and the like.

BACKGROUND OF THE INVENTION

Access control lists (ACLs) are used on routers to block inbound and/or outbound traffic on an interface (port) of the router. These lists define rules regarding what traffic is to be permitted or denied. They typically employ protocol, IP (internet protocol) addresses, and ports to identify traffic. ACLs are, for the most part, stateless and they only work on IP addresses. Accordingly, their capabilities are limited. The rules defined by the ACLs can be quite large and/or complicated. Accordingly, ACLs become difficult to maintain, even on just a single router; maintaining ACLs on a large network with hundreds or thousands of routers is quite difficult.

Thus, current practice re ACLs is inefficient and wasteful of time. Furthermore, new, tighter, security requirements and instances of hacking of networks by bad actors have motivated the implementation of stronger security measures. Furthermore in this regard, an ACL is essentially an access list for routers and the like. Currently, when a server is deployed in a network (by way of example and not limitation, a network of a cable multi-service operator (MSO) providing both data services and entertainment services (e.g., video)), inbound traffic from the outside Internet is typically blocked, primarily through the use of ACLs.

Firewalls are typically not suited for use with video traffic because of such traffic's very high (e.g., on the order of Gbps) bandwidth. Instead, ACLs are typically implemented on one or more of the network routers. However, this can lead to problems because typical networks include many routers (deployed, for example, in national data centers and/or regional data centers (refer to discussion of FIG. 1 below)). When deploying, for example, assets for a cloud-based digital video recorder (DVR), there are typically several different locations and many different routers and different networks, and the ACLs become very challenging to maintain. Typically, a ticket must be submitted to the network maintenance and engineering team, and it takes significant time (e.g., 3-6 weeks) to implement a new rule (e.g., to allow one port access into a server or allow a server to connect to another server on a network).

SUMMARY OF THE INVENTION

Principles of the invention provide techniques for dynamic centralized access list management and/or firewall management. In one aspect, an exemplary method includes, for a communications network having a plurality of network security elements and a plurality of existing network security element specification files which limit packet flow on the network security elements, obtaining, from a user, instructions to compose at least one of: a new network security element specification file; or one of the existing network security element specification files; facilitating queuing a configuration change request that implements the instructions in an implementation pipeline; and facilitating pushing the configuration change request to at least one corresponding network security element of the plurality of network security elements.

In another aspect, an exemplary system includes a memory; and at least one processor, coupled to the memory, and operative to, for a communications network having a plurality of network security elements and a plurality of existing network security element specification files which limit packet flow on the network security elements, obtain, from a user, at least one of: a new network security element specification file; or one of the existing network security element specification files; facilitate queuing a configuration change request that implements the instructions in an implementation pipeline; and facilitate pushing the configuration change request to at least one corresponding network security element of the plurality of network security elements.

In still another aspect, an exemplary system includes a communications network having a plurality of network security elements and a plurality of existing network security element specification files which limit packet flow on the network security elements; and a backend coupled to the plurality of network security elements. The backend is configured to obtain, from a user, instructions to compose at least one of: a new network security element specification file; or one of the existing network security element specification files. The backend is configured to facilitate queuing a configuration change request that implements the instructions in an implementation pipeline, to cause the configuration change request to be pushed to at least one corresponding network security element of the plurality of network security elements.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine-readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., backend 2011 discussed below, and the like) including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

Aspects of the present invention can provide substantial beneficial technical effects. For example, one or more embodiments of the invention achieve one or more of:

improves technological process(es) of operating, maintaining, and/or upgrading a communications network via advanced handling of ACLs for routers and the like;

enhances security of such networks by efficient establishment and maintenance of the ACLs;

particularly useful for high-bandwidth applications, such as video, where use of firewalls is not practical;

optionally provides capability to monitor all FQDNs (fully qualified domain names) used for ACLs on the system and dynamically adjust the ACLs if the Domain Name System (DNS) changes for any FQDN;

provides techniques to account for changes in ACLs on the network, permitting quickly reverting a change that has caused an outage, so as to restore services.

These and other features and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein:

FIG. 3 is a functional block diagram illustrating one exemplary HFC cable network head-end configuration, useful within the system of FIG. 1;

FIG. 11 shows a swim lane diagram for an inventory process, according to an aspect of the invention;

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

Figure 1:
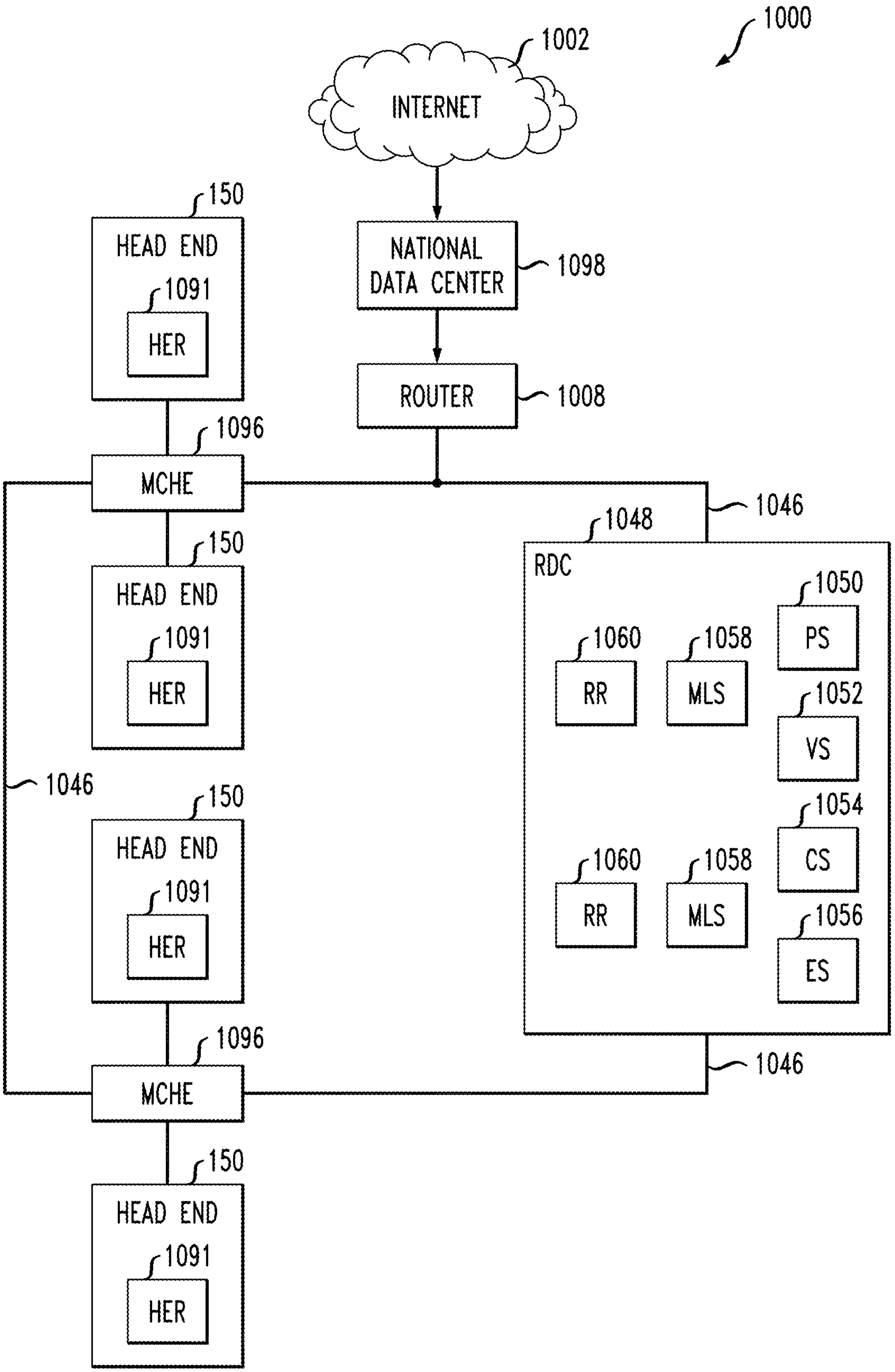
FIG. 1 is a block diagram of an exemplary embodiment of a system, within which one or more aspects of the invention can be implemented.

Purely by way of example and not limitation, some embodiments will be shown in the context of a cable multi-service operator (MSO) providing both data services and entertainment services (e.g., video). FIG. 1 shows an exemplary system 1000, according to an aspect of the invention. System 1000 includes a regional data center (RDC) 1048 coupled to several Market Center Head Ends (MCHEs) 1096; each MCHE 1096 is in turn coupled to one or more divisions, represented by division head ends 150. In a non-limiting example, the MCHEs are coupled to the RDC 1048 via a network of switches and routers. One suitable example of network 1046 is a dense wavelength division multiplex (DWDM) network. The MCHEs can be employed, for example, for large metropolitan area(s). In addition, the MCHE is connected to localized HEs 150 via high-speed routers 1091 ("HER"=head end router) and a suitable network, which could, for example, also utilize DWDM technology. Elements 1048, 1096 on network 1046 may be operated, for example, by or on behalf of a cable MSO, and may be interconnected with a global system of interconnected computer networks that use the standardized Internet Protocol Suite (TCP/IP) (transfer control protocol/Internet protocol), commonly called the Internet 1002; for example, via router 1008. In one or more non-limiting exemplary embodiments, router 1008 is a point-of-presence ("POP") router; for example, of the kind available from Juniper Networks, Inc., Sunnyvale, California, USA.

Head end routers 1091 are omitted from figures below to avoid clutter, and not all switches, routers, etc. associated with network 1046 are shown, also to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

A national data center (NDC) 1098 is provided in some instances; for example, between router 1008 and Internet 1002. In one or more embodiments, such an NDC may consolidate at least some functionality from head ends (local and/or market center) and/or regional data centers. For example, such an NDC might include one or more VOD servers; switched digital video (SDV) functionality; gateways to obtain content (e.g., program content) from various sources including cable feeds and/or satellite; and so on.

In some cases, there may be more than one national data center 1098 (e.g., two) to provide redundancy. There can be multiple regional data centers 1048. In some cases, MCHEs could be omitted and the local head ends 150 coupled directly to the RDC 1048.

Figure 2:
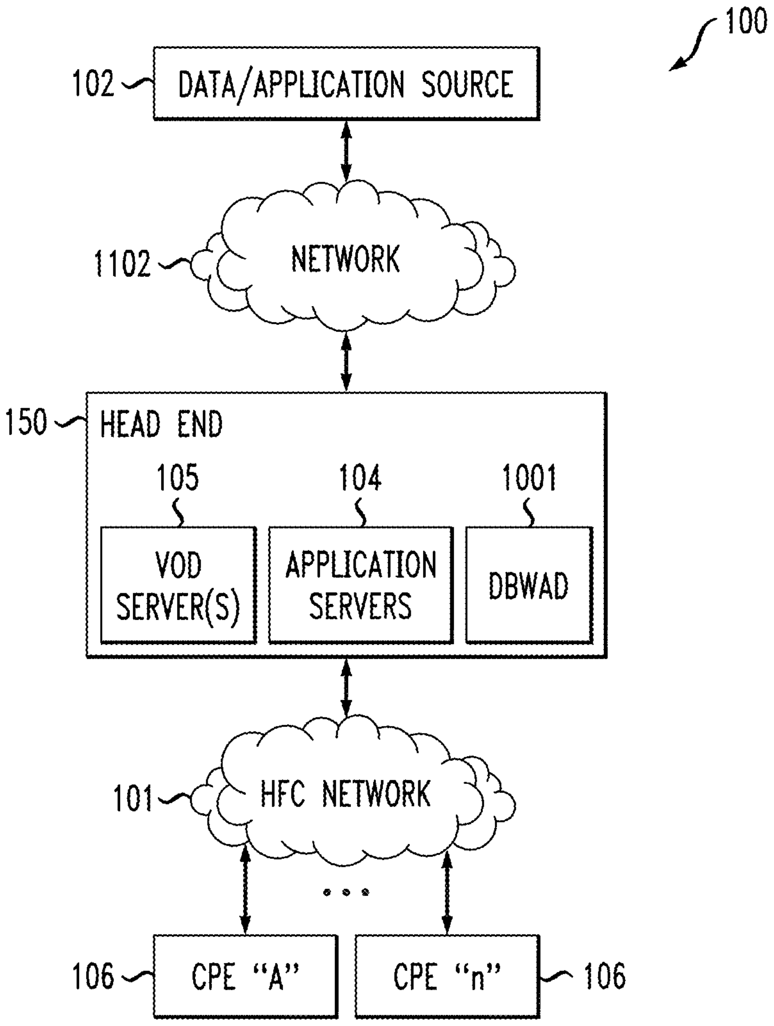
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/

0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE). The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

It should be noted that the exemplary CPE 106 is an integrated solution including a cable modem (e.g., DOCSIS) and one or more wireless routers. Other embodiments could employ a two-box solution; i.e., separate cable modem and routers suitably interconnected, which nevertheless, when interconnected, can provide equivalent functionality. Furthermore, FTTH networks can employ Service ONUs (S-ONUs; ONU=optical network unit) as CPE, as discussed elsewhere herein.

The data/application origination point 102 comprises any medium that allows data and/or applications (such as a VOD-based or "Watch TV" application) to be transferred to a distribution server 104, for example, over network 1102. This can include for example a third-party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within NDC 1098, RDC 1048, or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by the relevant upstream network components. Non-limiting examples of relevant upstream network components, in the context of the HFC network, include a distribution server 104 or a cable modem termination system 156 (discussed below with regard to FIG. 3). The skilled artisan will be familiar with other relevant upstream network components for other kinds of networks (e.g., FTTH) as discussed herein. Non-limiting examples of CPE are set-top boxes, high-speed cable modems, and Advanced Wireless Gateways (AWGs) for providing high bandwidth Internet access in premises such as homes and businesses. Reference is also made to the discussion of an exemplary FTTH network in connection with FIGS. 8 and 9.

Also included (for example, in head end 150) is a dynamic bandwidth allocation device (DBWAD) 1001 such as a global session resource manager, which is itself a non-limiting example of a session resource manager.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. In one or more embodiments, there are multiple CMTSs. Each may be coupled to an HER 1091, for example. See, e.g., FIGS. 1 and 2 of co-assigned U.S. Pat. No. 7,792,963 of inventors Gould and Danforth, entitled METHOD TO BLOCK UNAUTHORIZED NETWORK TRAFFIC IN A CABLE DATA NETWORK, the complete disclosure of which is expressly incorporated herein by reference in its entirety for all purposes.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville CO 80027, USA) and associated protocols (e.g., DOCSIS 1.x, 2.0. or 3.0). The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

Furthermore in this regard, DOCSIS is an international telecommunications standard that permits the addition of high-speed data transfer to an existing cable TV (CATV) system. It is employed by many cable television operators to provide Internet access (cable Internet) over their existing hybrid fiber-coaxial (HFC) infrastructure. HFC systems using DOCSIS to transmit data are one non-limiting exemplary application context for one or more embodiments. However, one or more embodiments are applicable to a variety of different kinds of networks.

It is also worth noting that the use of DOCSIS Provisioning of EPON (Ethernet over Passive Optical Network) or "DPoE" (Specifications available from CableLabs, Louisville, CO, USA) enables the transmission of high-speed data over PONs using DOCSIS back-office systems and processes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

An ISP DNS server could be located in the head-end as shown at 3303, but it can also be located in a variety of other places. One or more Dynamic Host Configuration Protocol (DHCP) server(s) 3304 can also be located where shown or in different locations.

It should be noted that the exemplary architecture in FIG. 3 shows a traditional location for the CMTS 156 in a head end. As will be appreciated by the skilled artisan, CMTS functionality can be moved down closer to the customers or up to a national or regional data center or can be dispersed into one or more locations.

Figure 4:
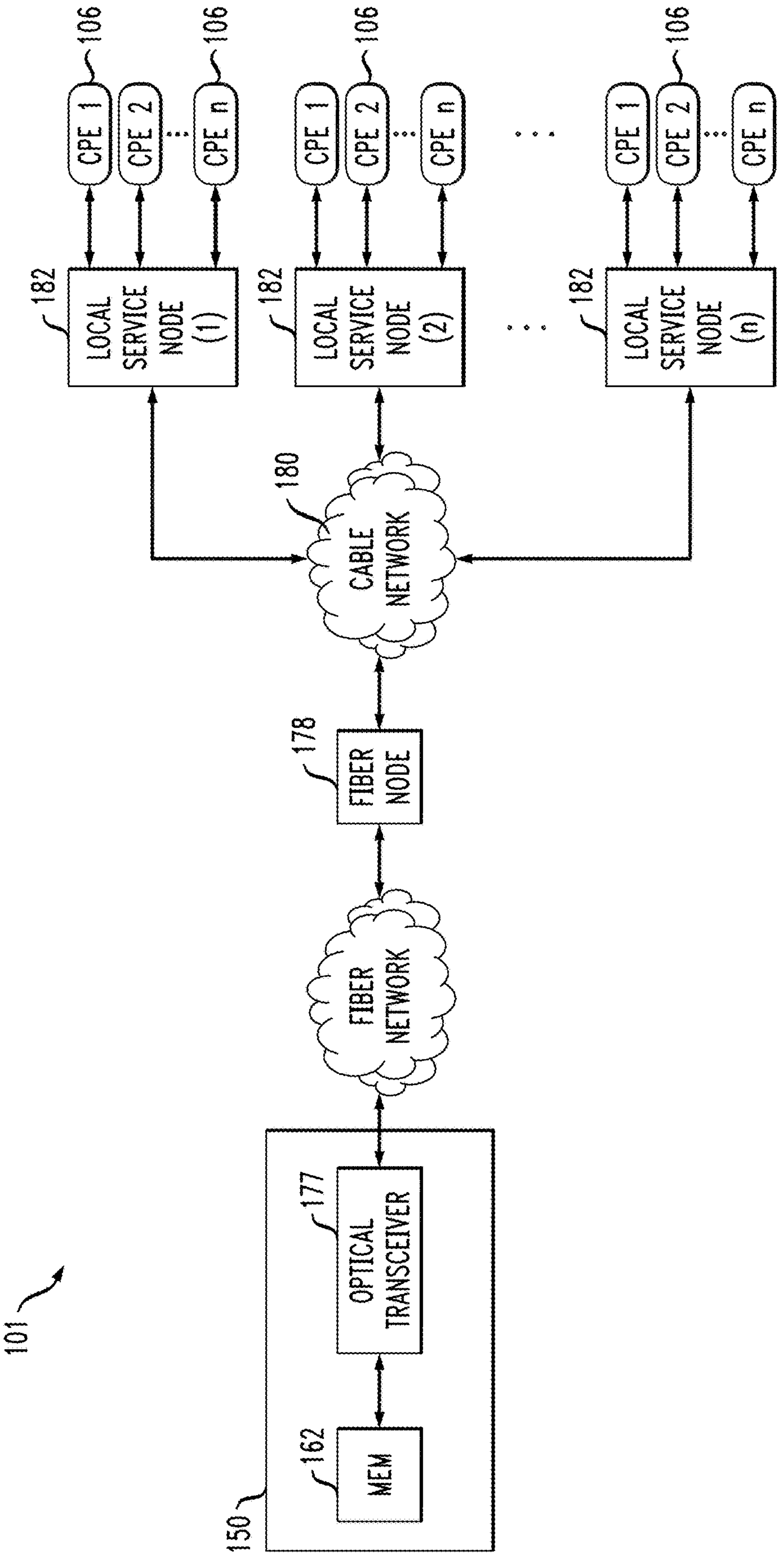
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network 179 to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM). Please note that the number n of CPE 106 per node 182 may be different than the number n of nodes 182, and that different nodes may service different numbers n of CPE.

Certain additional aspects of video or other content delivery will now be discussed. It should be understood that embodiments of the invention have broad applicability to a variety of different types of networks. Some embodiments relate to TCP/IP network connectivity for delivery of messages and/or content. Again, delivery of data over a video (or other) content network is but one non-limiting example of a context where one or more embodiments could be implemented. US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture, although it will be recognized by those of ordinary skill that other approaches and architectures may be substituted. In a cable television system in accordance with the Brooks invention, program materials are made available to subscribers in a neighborhood on an as-needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood. Note that reference is made herein, for brevity, to features of the "Brooks invention"—it should be understood that no inference should be drawn that such features are necessarily present in all claimed embodiments of Brooks. The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device 1001.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

Figure 5:
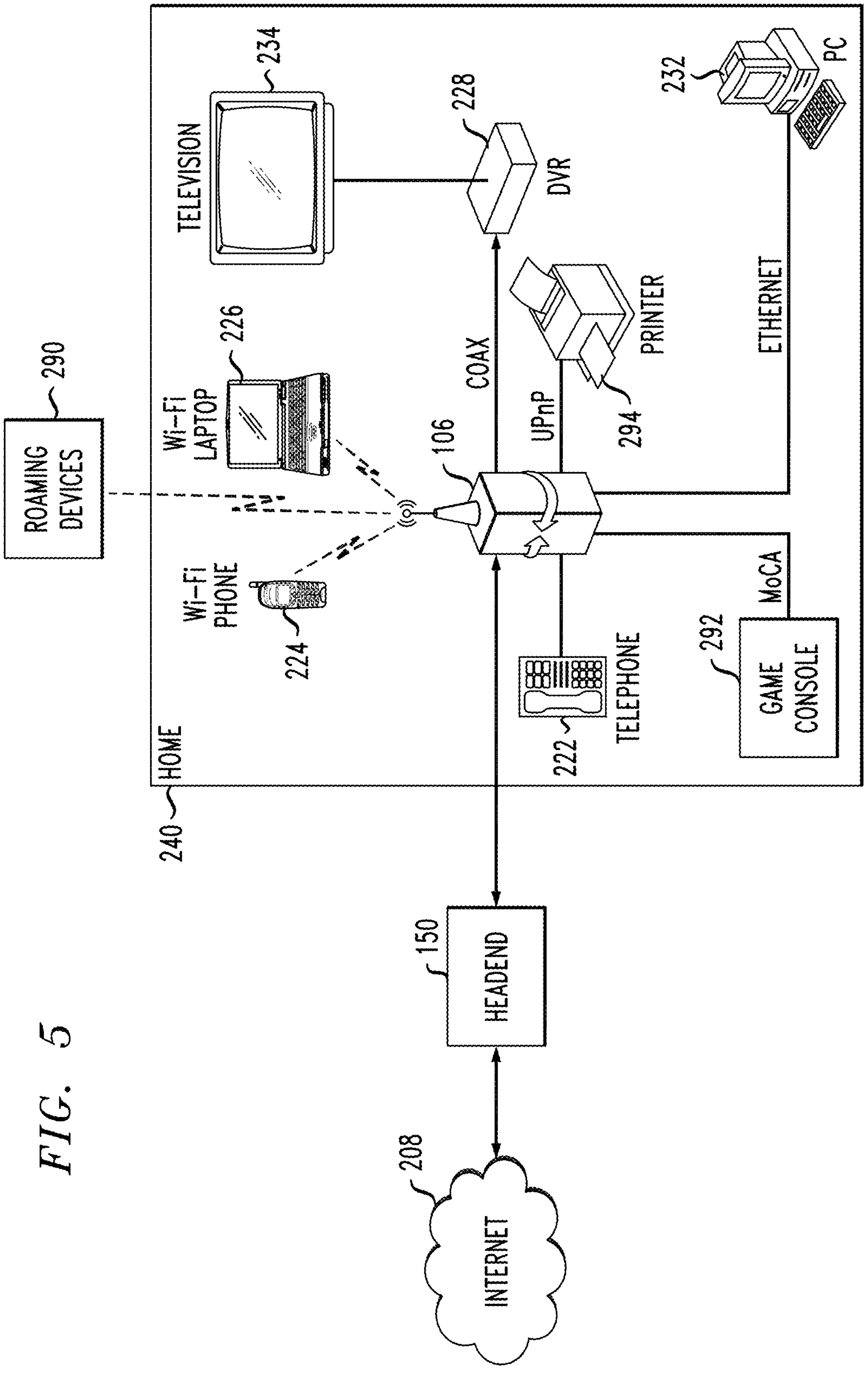
FIG. 5 is a functional block diagram of a premises network, including an exemplary centralized customer premises equipment (CPE) unit, interfacing with a head end such as that of FIG. 3.
Figure 6:
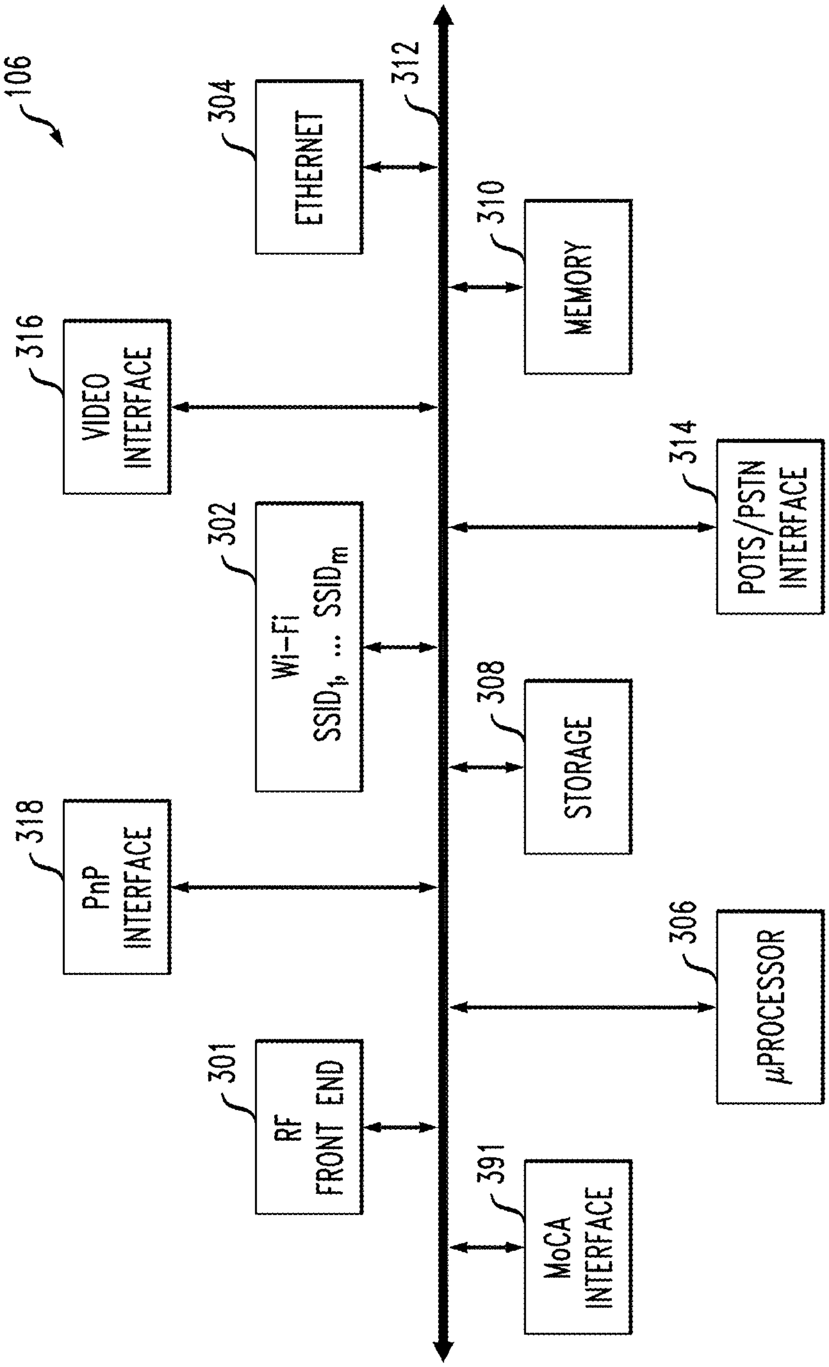
FIG. 6 is a functional block diagram of an exemplary centralized CPE unit, useful within the system of FIG. 1.

Reference should now be had to FIG. 5, which presents a block diagram of a premises network interfacing with a head end of an MSO or the like, providing Internet access. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed in one or more embodiments; for example, a cable modem, DSL modem, and the like. The CPE can also be a Service Optical Network Unit (S-ONU) for FTTH deployment-see FIGS. 8 and 9 and accompanying text.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system 156 thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example, over a universal plug and play (UPnP) interface, and/or a game console 292; for example, over a multimedia over coax alliance (MoCA) interface.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., Internet traffic (IPv4 or IPv6), digital programming and other digital signaling or content such as digital (packet-based; e.g., VOIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 5. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VOIP), or may utilize another protocol or transport mechanism. The well-known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random-access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. Yet again, many other types of CPE can be employed in one or more embodiments; for example, a cable modem, DSL modem, and the like.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

Yet again, it will also be recognized that the CPE configuration shown is essentially for illustrative purposes, and various other configurations of the CPE 106 are consistent with other embodiments of the invention. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

It should be noted that some embodiments provide a cloud-based user interface, wherein CPE 106 accesses a user interface on a server in the cloud, such as in NDC 1098.

The RF front end 301 of the exemplary embodiment comprises a cable modem of the type known in the art. In some cases, the CPE just includes the cable modem and omits the optional features. Content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g., the Wi-Fi interface 302, Ethernet interface 304 or plug-and-play (PnP) interface 318.

Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std. 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g., Internet protocol television (IPTV) devices, PCs, laptops, etc., as well as by roaming devices 290. In addition, the CPE 106 can be remotely managed (such as from the head end 150, or another remote network agent) to support appropriate IP services. Some embodiments could utilize a cloud-based user interface, wherein CPE 106 accesses a user interface on a server in the cloud, such as in NDC 1098.

In some instances, the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network. Yet again, it should be noted that some embodiments could employ a cloud-based user interface, wherein CPE 106 accesses a user interface on a server in the cloud, such as in NDC 1098. The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

Figure 8:
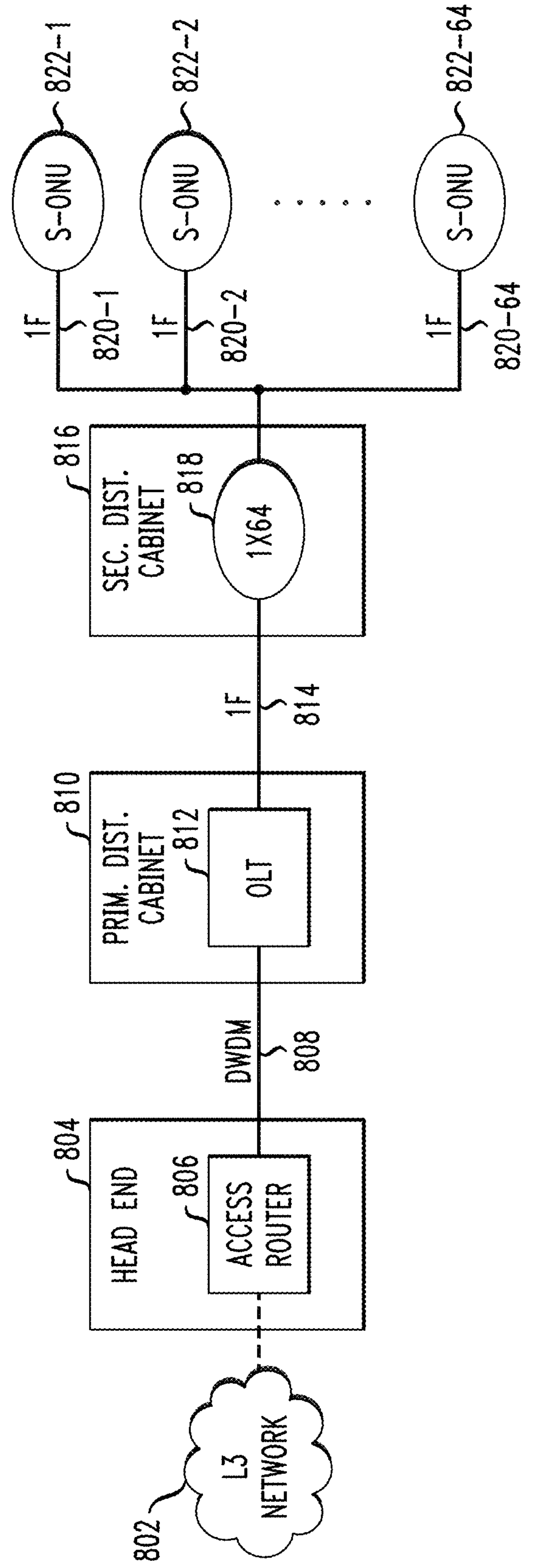
FIG. 8 is a functional block diagram illustrating an exemplary FTTH system, which is one exemplary system within which one or more embodiments could be employed.

As noted, there are also fiber networks for fiber to the home (FTTH) deployments (also known as fiber to the premises or FTTP), where the CPE is a Service ONU (S-ONU; ONU=optical network unit). Referring now to FIG. 8, L3 network 802 generally represents the elements in FIG. 1 upstream of the head ends 150, while head end 804, including access router 806, is an alternative form of head end that can be used in lieu of or in addition to head ends 150 in one or more embodiments. Head end 804 is suitable for FTTH implementations. Access router 806 of head end 804 is coupled to optical line terminal 812 in primary distribution cabinet 810 via dense wavelength division multiplexing (DWDM) network 808. Single fiber coupling 814 is then provided to a 1:64 splitter 818 in secondary distribution cabinet 816 which provides a 64:1 expansion to sixty-four S-ONUs 822-1 through 822-64 (in multiple premises) via sixty-four single fibers 820-1 through 820-64, it being understood that a different ratio splitter could be used in other embodiments and/or that not all of the 64 (or other number of) outlet ports are necessarily connected to an S-ONU.

Figure 9:
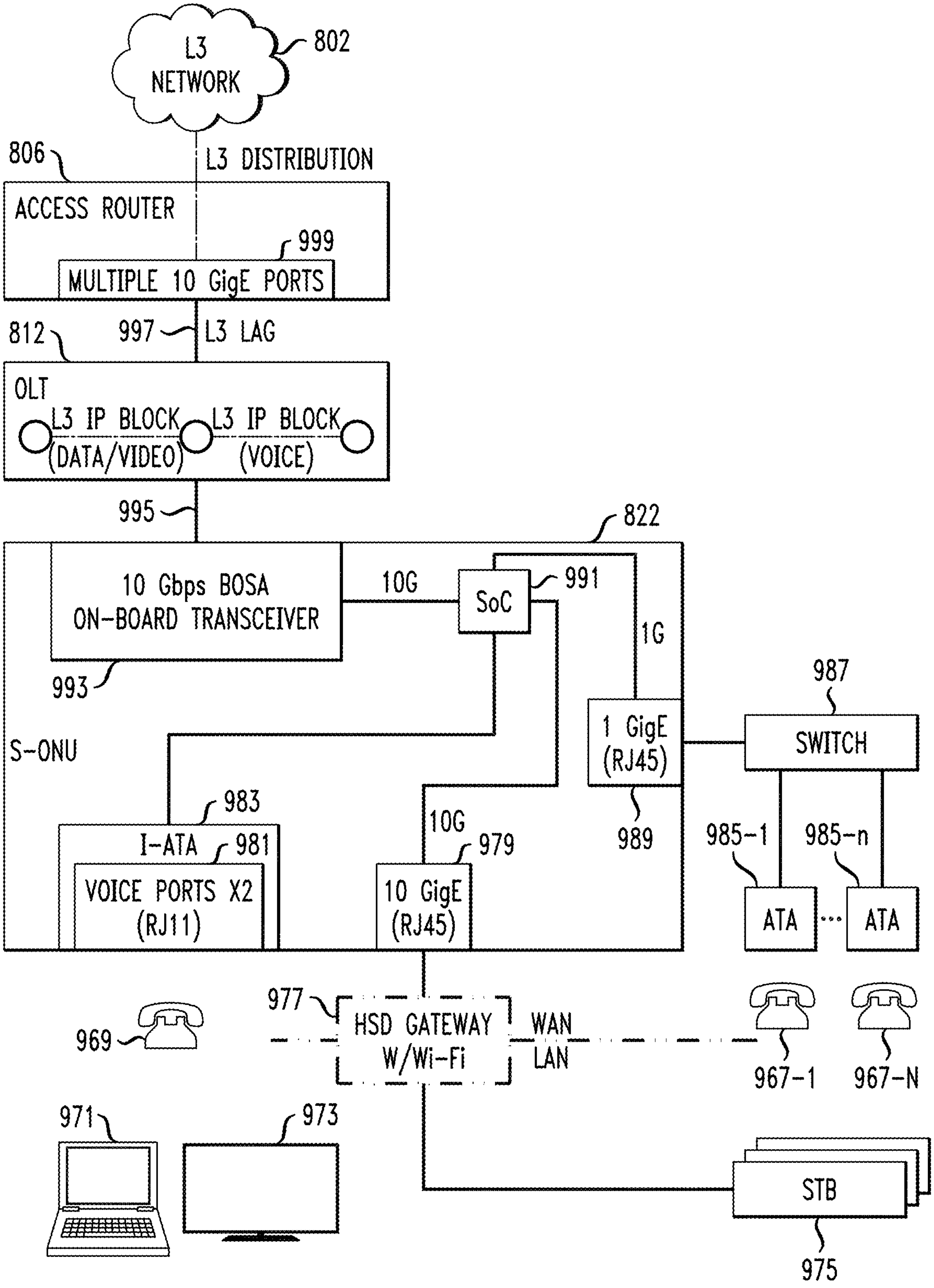
FIG. 9 is a functional block diagram of an exemplary centralized S-ONU CPE unit interfacing with the system of FIG. 8.

Giving attention now to FIG. 9, wherein elements similar to those in FIG. 8 have been given the same reference number, access router 806 is provided with multiple ten-Gigabit Ethernet ports 999 and is coupled to OLT 812 via L3 (layer 3) link aggregation group (LAG) 997. OLT 812 can include an L3 IP block for data and video, and another L3 IP block for voice, for example. In a non-limiting example, S-ONU 822 includes a 10 Gbps bi-directional optical sub-assembly (BOSA) on-board transceiver 993 with a 10G connection to system-on-chip (SoC) 991. SoC 991 is coupled to a 10 Gigabit Ethernet RJ45 port 979, to which a high-speed data gateway 977 with Wi-Fi capability is connected via category 5E cable. Gateway 977 is coupled to one or more set-top boxes 975 via category 5e, and effectively serves as a wide area network (WAN) to local area network (LAN) gateway. Wireless and/or wired connections can be provided to devices such as laptops 971, televisions 973, and the like, in a known manner. Appropriate telephonic capability can be provided. In a non-limiting example, residential customers are provided with an internal integrated voice gateway (I-ATA or internal analog telephone adapter) 983 coupled to SoC 991, with two RJ11 voice ports 981 to which up to two analog telephones 969 can be connected. Furthermore, in a non-limiting example, business customers are further provided with a 1 Gigabit Ethernet RJ45 port 989 coupled to SoC 991, to which switch 987 is coupled via Category 5e cable. Switch 987 provides connectivity for a desired number n (typically more than two) of analog telephones 967-1 through **967-*n*, suitable for the needs of the business, via external analog telephone adapters (ATAs) 985-1 through 985-*n*. The parameter "n" in FIG. 9 is not necessarily the same as the parameter "n" in other figures, but rather generally represents a desired number of units. Connection 995** can be, for example, via SMF (single-mode optical fiber).

In addition to "broadcast" content (e.g., video programming), the systems of FIGS. 1-6, 8, and 9 can, if desired, also deliver Internet data services using the Internet protocol (IP), although other protocols and transport mechanisms of the type well known in the digital communication art may be substituted. In the systems of FIGS. 1-6, the IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve. Furthermore, one or more embodiments could be adapted to situations where a cable/fiber broadband operator provides wired broad band data connectivity but does not provide QAM-based broadcast video.

Principles of the present disclosure will be described herein in the context of apparatus, systems, and methods for dynamic centralized access list/firewall management. It is to be appreciated, however, that the specific apparatus and/or methods illustratively shown and described herein are to be considered exemplary as opposed to limiting. Moreover, it will become apparent to those skilled in the art given the teachings herein that numerous modifications can be made to the embodiments shown that are within the scope of the appended claims. That is, no limitations with respect to the embodiments shown and described herein are intended or should be inferred. Initially, a detailed embodiment will be described in the context of routers and router access control lists (for convenience, access control lists associated with routers are referred to herein as router access control lists or simply access control lists, as will be appreciated by the skilled artisan given the context). One or more embodiments are also applicable to firewalls. Access control lists in the context of firewalls are discussed below.

As noted above, new, tighter, security requirements and instances of hacking of networks by bad actors have motivated the implementation of stronger security measures, and firewalls are typically not suited for use with video traffic because of its very high (e.g., on the order of Gbps) bandwidth. Instead, ACLs are typically implemented on one or more of the network routers. However, this can lead to problems and the ACLs become very challenging to maintain. One or more embodiments advantageously overcome these challenges in the prior art by providing an online tool to efficiently submit an ACL request such that the ACL request is automatically deployed, or automatically placed in a queue such that it can be automatically configured by a human operator. This is in contrast to current systems, which typically merely automatically create a ticket with a spreadsheet that sets forth what needs to be manually configured on each router.

Figure 10:
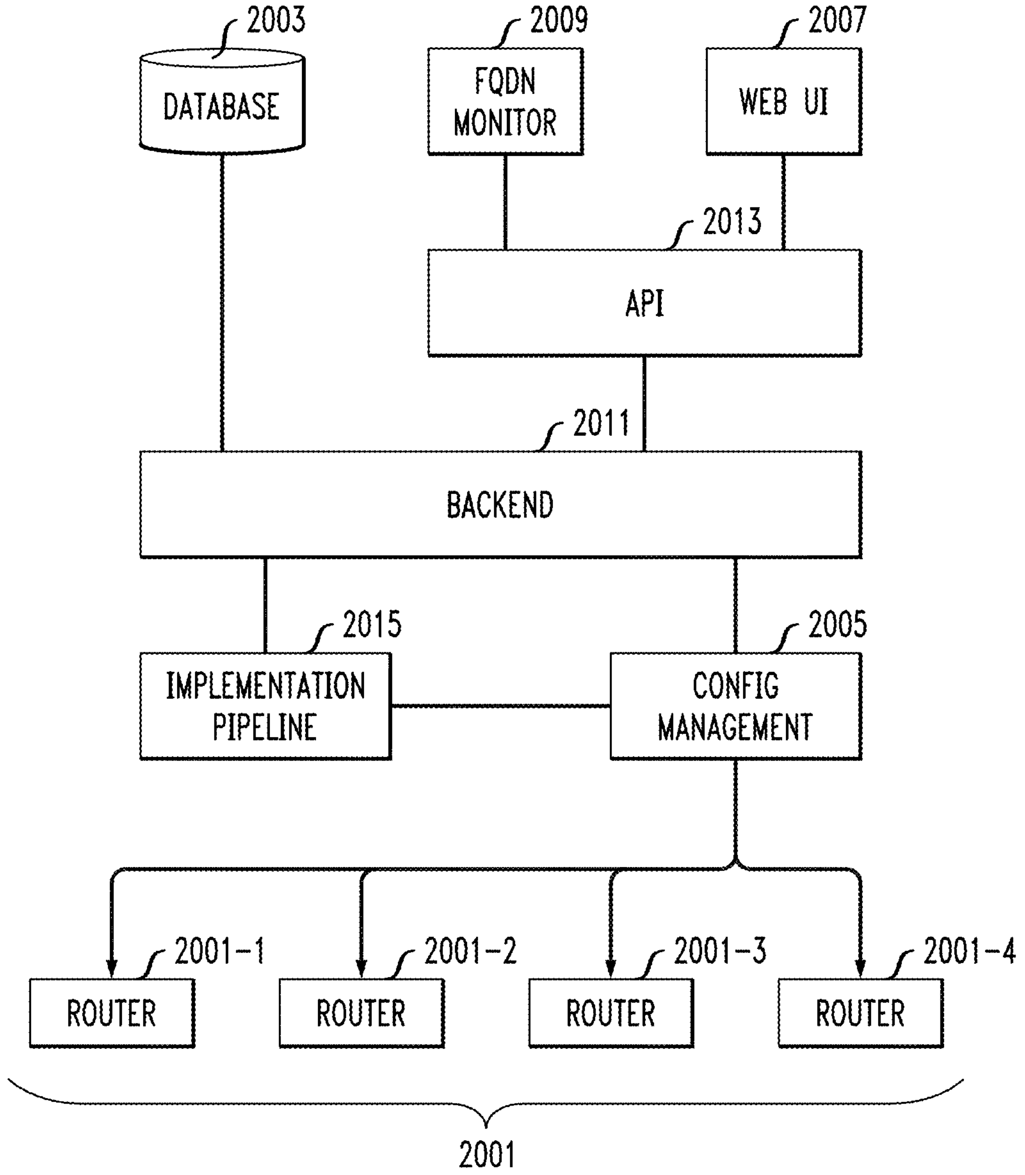
FIG. 10 is system diagram, in accordance with an aspect of the invention.

Referring to FIG. 10, one or more embodiments take an inventory of routers 2001-1, 2001-2, 2001-3, 2001-4 (generally, 2001; four are depicted but there can be any desired number of routers) that have been entered into the system (e.g., in the database 2003) and are capable of having the system carry out ACL provisioning. These aspects are implemented, for example, using the config management process 2005 and the database 2003. The database 2003 holds the inventory of routers 2001 and, optionally, how the ACLs are currently configured on each of the routers. The database 2003 can store, for example, a basic inventory including items such as router host name, IP address, how to log in and provision, location, and the like. The database 2003 can also include, for each router, a basic ACL configuration; the database can even serve as a cache of the configuration. A network such as a network of a cable multi-service operator (MSO) providing both data services and entertainment services (e.g., video)) typically has thousands of routers 2001.

The Web UI 2007 provides a web-based user interface for a user. There can be, for example, an admin user ("admin" or "administrator") and a "regular" user (or simply "user"). The regular user can be, for example, a network engineer that desires to implement an ACL rule on a router 2001. The admin user is responsible for the routers and their configurations, and will approve or deny the requested change, and possibly even push the requested configuration change out to the router. Refer to steps 2401, 2403, 2405, 2407 in FIG. 14, discussed elsewhere herein. In some instances, configuration changes can be implemented during network “off hours.” Given the teachings herein regarding the functioning of the Web UI 2007, the skilled artisan can readily implement same using, for example, HyperText Markup Language (HTML) served out to a browser. Appropriate two-factor authentication or other suitable security techniques can be employed in one or more embodiments.

In one or more embodiments, the “regular” user requests the ACL change, while the admin, likely a separate person, decides whether to allow change that was requested. For example, the admin “owns” the router network and can be a manager.

In one or more embodiments, the FQDN monitor 2009 provides an advanced feature set. Many IP addresses are typically involved when communicating with the Internet. Internet Protocol Version 4 (IPv4) addresses are exhausted, and Internet Protocol Version 6 (IPv6) addresses are in common use. A network such as a network of a cable multi-service operator (MSO) providing both data services and entertainment services (e.g., video)) may seek to connect to a cloud platform that provides virtual resources, web services, and the like. This may prove problematic in some instances, as it may not be appropriate to allow an external cloud service provider to have access to an MSO’s network, since the required APLs would be prohibitive, inasmuch as the cloud service provider may have thousands of subnets that it uses in its cloud services. Attempting to handle this problem with current technology (by listing thousands of subnets on each router) would tend to bog down the routers. Consider the FQDN monitor 2009. Suppose it is desired to have a network server (e.g., of the MSO) communicate with a server on the Internet. Further suppose that it is desired that the server on the Internet be able to communicate back to the MSO’s server through the ACL. A fully qualified domain name (FQDN) is a domain name that specifies its exact location in the tree hierarchy of the Domain Name System (DNS). It specifies all domain levels, including the top-level domain and the root zone. In one or more embodiments, instead of proving an IP address list for the ACL that it is desired to use, the FQDN monitor 2009 allows instead entering the FQDN (e.g., www dot sampleexternaldomain dot com where the notation “dot” is employed instead of “.” to avoid including browser-executable code in the patent application) and the FQDN monitor 2009 carries out a DNS lookup to determine the currently-used IP address(es) and dynamically build the access list. In one or more embodiments, the FQDN monitor 2009 continues to periodically poll (because the DNS potentially changes over time), and, if there is a change (e.g., addition of a new IP address), the FQDN monitor 2009 can automatically make the required change(s) on all of the routers 2001 in the network. See, for example, discussion of FIG. 13 below.

The back end 2011 includes, for example, an application (written, e.g., in PYTHON or another suitable high-level language), running on a suitable server, which implements one or more embodiments and ties all the other components together. In computing, a daemon is a program that runs continuously as a background process and wakes up to handle periodic service requests, which often come from remote processes. In some instances, back end 2011 is implemented as a daemon. In some instances, back end 2011 hosts an API 2013 that the web interface communicates with. In a non-limiting example, the Web UI 2007 obtains a new request from a user 2099 (user 2099 is depicted below in FIGS. 11-13), and the request hits the backend API 2013. The back end 2011 recognizes the request as an ACL request and initiates a lookup in database 2003 to determine there is an ACL for this request on the appropriate router 2001. If the answer is yes, no action is needed, the user is merely advised that the request was already implemented, on which routers 2001, and when. However, if there is not a corresponding ACL, or there is an ACL but it does not have the proper functionality, a new ACL is added or an existing ACL is edited.

Figure 14:
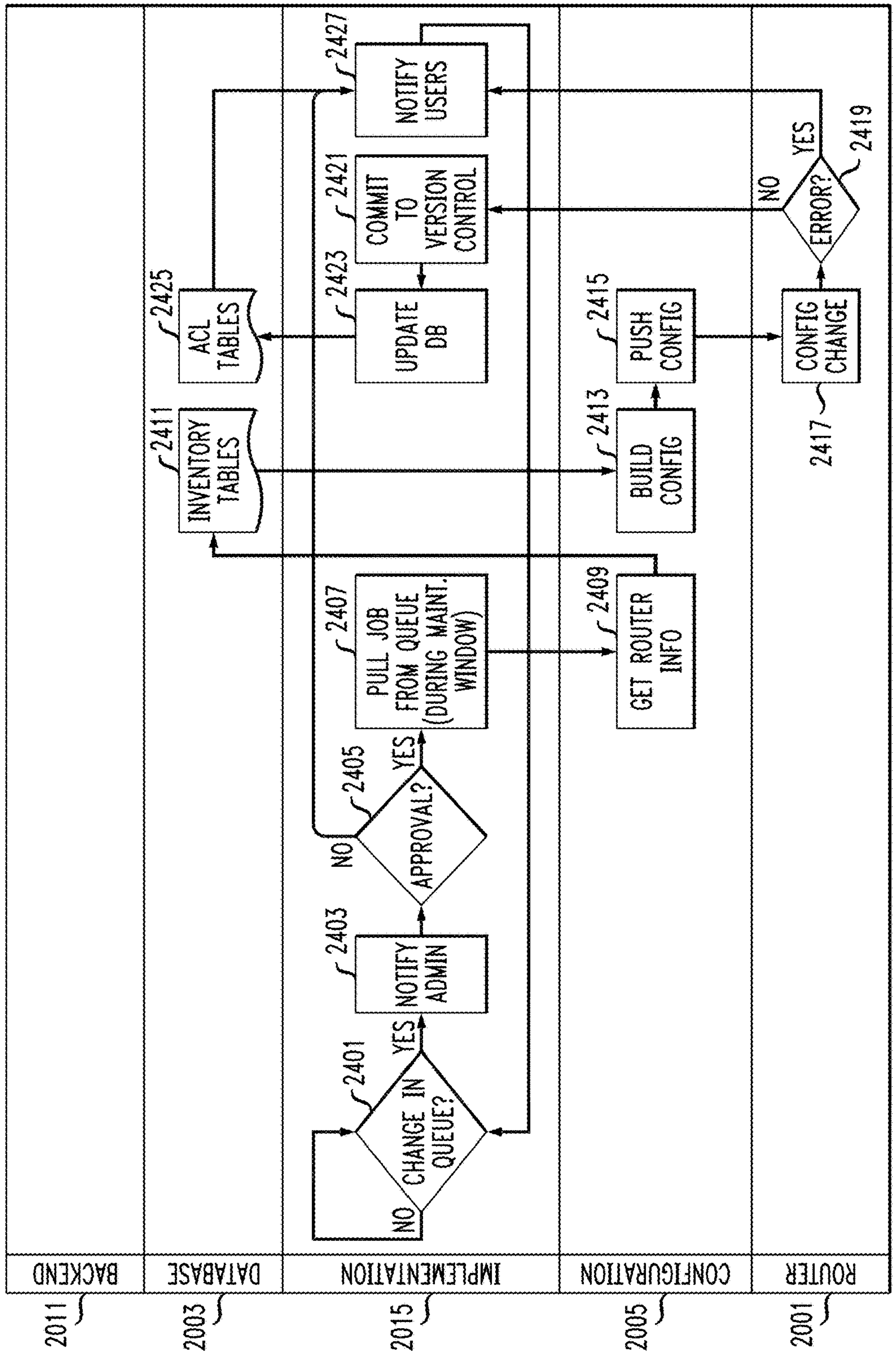
FIG. 14 shows a swim lane diagram for an implementation pipeline/configuration process, according to an aspect of the invention.

Now consider how the back end 2011 communicates with the routers 2001. One or more embodiments include an implementation pipeline 2015 and the config (configuration) management module 2005. In one or more embodiments, when a change needs to be made, the implementation pipeline 2015 implements the change as depicted in FIG. 14 and discussed further below. In one or more embodiments, the config management module 2005 implements a process that interacts with the router. In one or more embodiments, the config management process is implemented with custom written software. Alternatively, modify a router vendor’s existing code. The skilled artisan, given the teachings herein, will be able to implement the config management process with custom written software or by modifying code of existing router vendors such as Cisco Systems, Inc., San Jose, CA, USA; Arista Networks, Santa Clara, CA, USA; and Juniper Networks, Inc., Sunnyvale, CA, USA.

In one or more embodiments, the UI 2007 and database 2003 are implemented using well-known techniques (e.g., UI 2007 implemented by serving HTML out to a browser, database 2003 implemented with commercial relational database or graph database software). Known commercial routers can be used. Known protocols can be used to communicate with the routers 2001 to instruct them to instantiate ACLs and the like; for example, protocols such as Secure Shell (SSH) or TELNET (Terminal Network).

Consider the implementation pipeline 2015 as a process. Typically, whenever a change is made in production, the change is documented. This can be done, for example, using version control software (non-limiting examples of such software include GIT® (registered mark of Software Freedom Conservancy, Inc. Brooklyn NEW YORK), GitLab® (registered mark of GITLAB BV Utrecht NETHERLANDS), GitHub® (registered mark of GitHub, Inc. San Francisco CALIFORNIA), and Bitbucket® (registered mark of Atlassian Pty Ltd Sydney AUSTRALIA) (Bitbucket Server was formerly known as Stash)) to check in the code. Given the teachings herein, the skilled artisan could also write his or her own versioning software to implement one or more embodiments. In one or more embodiments, for any change, determine what the change is and how the changed ACL differs from the previous version of the ACL. As will be appreciated by the skilled artisan, commits are the core building block units of a Git project timeline (an example is provided in the context of Git, but other versions control software packages have their own similar commands for similar purposes, as will be appreciated by the skilled artisan). Commits can be thought of as snapshots or milestones along the timeline of a Git project. Commits are created with the git commit command to capture the state of a project at that point in time, and essentially provide a versioning system for config changes, for example, with respect to computer code and the like. For example, whenever a code change is made, commit that change and check it into Git. Git implements a checksum, and advises the user what changed from the last check-in. In a non-limiting example, the implementation pipeline 2015 can employ Git. For example, before making changes to the system and pushing down a config change to the routers 2001, check the change into version control, so that if something goes wrong, the system can be rolled back to the previous version. Thus, given the teachings herein, the pipeline 2015 can be implemented, for example, by adapting an existing versioning system. Refer, for example, to the discussion of FIG. 14 below.

In one or more embodiments, a user submits a request via the UI 2007, and then, if that request has an FQDN instead of an IP address, it is entered into the database 2003 for FQDN monitoring via monitor 2009.

It will thus be appreciated that one or more embodiments automate the management of router access-lists. This process can be used, for example, to provide access-list automation for a group of routers and to minimize the large amount of manual work required to build and maintain ACLs across groups of routers. This process can also provide features that are not currently available today.

Access lists (ACLs) are used on routers to block traffic inbound or outbound on an interface of a router. These lists define rules regarding what traffic to permit or to deny. The rules use protocol, IP addresses, and ports to identify traffic. ACLs are, for the most part, stateless and only work on IP addresses, and therefore typically have limited capability. The ACL rules can also get quite complicated, large, and become difficult to maintain on just a single router (let alone on large networks with hundreds or thousands of routers). One or more embodiments provide processes and/or systems to handle user requests for ACL changes, add the capability for using FQDNs instead of source or destination IP addresses, and/or provide for versioning/history of ACL changes.

A first step in one or more embodiments (order of steps can vary in other embodiments) includes defining an inventory of all routers 2001 and named ACLs to be used in the system. Each access-list on the system should be defined with a unique name, so that the system can identify each set of rules across any router in the system. An ACL may be used on more than one router if the router has interfaces that serve the same type of hosts/applications. This inventory will be stored in a database 2003 and changes to ACL rules can be tracked for version history.

A second step in one or more embodiments (order of steps can vary in other embodiments) is to set up a UI 2007 so that users 2099 can log in and be granted appropriate permissions. Once a user has the appropriate permissions, he or she will be able to view or edit any ACL that he or she has permissions for. When edits are completed, the user can be presented with how her or his changes are different from the currently deployed rules, and can be asked if she or he would like to continue with the new changes. Once the changes are accepted, the change request will be put into an implementation pipeline 2015 for implementation on the router(s) that the ACL in question resides on.

The implementation pipeline 2015 can be customized as the organization desires. Rules can be set up so that changes can be applied automatically or manually. The pipeline can require manager or peer approvals prior to implementation. Hours of implementation or "blackout" times can also be set up.

After the new rules are implemented, the database 2003 is updated with the returned status, and notification is provided to the user of failure or success, as the case may be. Refer to the discussion of FIG. 11 below.

As an added feature, a mechanism can be implemented so that the user can specify FQDNs instead of IP addresses for ACL rules. An FQDN monitor module 2009, dedicated to periodic FQDN checks, can be implemented, and when a change in IP address is detected, the system can automatically submit a new implementation rule to the pipeline to add a new IP address to the existing ACL rules. The system can also maintain a history of IP addresses used for the FQDN and automatically remove IP addresses that haven't been used for some predetermined/configurable time period. For example, start with a period on the order of two weeks (or even one or two years), observe performance of the system, and adjust as needed-given the teachings herein, the skilled artisan can heuristically determine a suitable initial value for the configurable time, and can assess performance and adjust as needed, for a particular implementation case. Refer to the discussion of FIG. 13 below.

Database: The database 2003 contains persistent storage for all relevant information needed to run the system. A pertinent component of the database is an inventory of managed routers with hostnames, IPs, access type (SSH, Telnet, and the like), login credentials, ACL names, interfaces with ACLs, router vendor, router type, and so on. The database can also contain user tables with login credentials, access type (Admin, User, Read-Only) and other pertinent information that the web interface needs to authenticate and authorize user access to the system.

Web UI: The Web User Interface 2007 provides the main interface to the system for administration, and submitting new requests to the system. The UI will only allow authenticated access to the system and will authorize the type of access based on individual user permissions. The inventory of routers that are set up on the system can be managed via the Web UI by users who have administrator privileges on the system. Inventory can be added, modified or removed via this interface. The Web UI can also be used to submit user changes for new ACL changes. Only users that have proper authorization can submit new ACL change requests. Users can also see the current state of configured ACLs on any router in the system. This read-only type of access can be granted to any user on the system.

Backend: The backend 2011 is the main part of the system. It interfaces with all of the other components (or to other components via the API 2013). This is the component that will Authorize/Authenticate/Account for users on the system (or provide external hooks to other external AAA systems). The backend should contain configurable logging levels for troubleshooting the backend logs when things go wrong. Since the backend is taking user input, it should also verify that all input data is formatted correctly before making any modifications to the database. The backend will notify the user if any data is input incorrectly and will provide proper response codes back via the API. The backend should use a configuration file so that administrators can easily configure the system. Variables such as inventory check frequency, email server, DNS server(s), database connection details, admin account credentials, and any other tunable variables should be configurable via the configuration file.

Another pertinent aspect of the backend is the proper formatting of the router config changes, by knowing what the router type and version are. This ensures that the proper formatting is used when sending configuration changes to the pipeline 2015 for implementation on the router 2001. The backend is aware of all inventory details via the DB 2003, and knows the command formatting for all router types/versions on the system. Because of this, the backend should periodically check inventory for current status, configuration, and version of all routers on the system.

API: The system will provide an Application Programming Interface 2013 that will allow a programming interface to the system for external calls. The API will also be utilized for calls to/from the FQDN Monitor 2009 and Web Interface 2007. In a non-limiting example, API 2013 is implemented as a RESTful API.

Implementation Pipeline with Version Control: The implementation pipeline 2015 is used to determine how changes are pushed to configuration management. ACL configuration changes can be set up to push automatically (without administrator approval), or to only push when an administrator approves each change. The pipeline can also determine time windows when configuration changes are allowed on the system. Version Control is used to check-in configuration changes for each managed router 2001. This provides a history of configuration changes on every managed router, and can be used to revert a configuration on any router back to a known good state. The system can use well known version systems as discussed above, a custom-written system, and the like.

FQDN Monitor: Because, in one or more embodiments, the system allows a user to enter an FQDN in place of IP addresses, the FQDN Monitor 2009 is used to periodically monitor all FQDNs (fully qualified domain names) used for ACLs on the system and dynamically adjust the ACLs if the DNS changes for any FQDN. Each FQDN can be monitored in real time based on its DNS TTL. If an IP address change is detected for a given FQDN, then the change should be fed to the backend 2011 with new IP addresses, and new configurations should be staged for all routers 2001 affected. Each FQDN to be monitored should be provisioned with a mode to tell the system how to handle FQDN IP address changes. "Add" mode tells the system that when a change is detected, only add the new IPs to the system. "Delete" mode tells the system to delete old IP addresses after they have been stale for a predetermined/configurable time period (see discussion above re initial values and heuristic adjustment).

Configuration Management: The Configuration Management module 2005 pushes the changes to the routers 2001 on the system, and can also pull configurations from the managed routers. The system should periodically check each router 2001 for configuration changes outside of this system and pull those changes into version control. Consider that there will typically be a network of routers 2001 that the system is controlling. In some instances, a configuration change may be made by an authorized human operator outside of the system. For example, there may have been an emergency where an authorized person needed to restore a config. A router may have crashed and re-booted with the default config rather than the appropriate config. One or more embodiments check for such one-off cases where the router config was changed outside of the system. The checking period can be customized for each router, or a default time can be used. The system should be aware of router groups and user groups and only allow users to change ACLs on routers that they are authorized for.

Routers: The routers 2001 are the devices on which the system manages ACLs. Once a router is entered into the system, its ACL rules are managed by the system. The term "router" is used herein in its standard meaning, namely, a router is a networking device that forwards data packets between communication networks.

FIG. 11 shows a swim lane diagram for an inventory process, according to an aspect of the invention. At 2101, the user 2099 decides to add inventory (e.g., add a router to inventory). At 2103, the user fills out an inventory form using the web UI 2007. At 2105, the web UI 2007 uses API 2013 to instruct the back end 2011 to add a router. In decision block 2107, back end 2011 determines whether user 2099 is authorized. If not (NO branch) the web UI displays an error at 2115. On the other hand, if the user is authorized (YES branch), at 2109, back end 2011 causes the data for the added router to be stored in database 2003. In response, database 2003 attempts to update its tables at 2111. In decision block 2113, back end 2011 determines whether the database update was successful. If not (NO branch), the web UI displays an error at 2115. On the other hand, if the database update was successful (YES branch), at 2117, the web UI displays a success message at 2117.

At 2119, the user 2099 asks the web UI 2007 to display the current inventory via inventory selection functionality 2121 of the web UI. At 2123, the inventory selection functionality 2121 of the web UI employs API 2013 to retrieve the routers for display. This causes back end 2011 to send a get data request 2125 to the database 2003. Database 2003 obtains the inventory from memory at 2127 and the same is displayed by the web UI at 2129.

At 2131, the user 2099 asks the web UI 2007 to modify the current inventory via "modify fields" functionality 2133 of the web UI 2007. At 2135, the modify fields functionality 2133 of the web UI employs API 2013 to attempt to modify the routers. In decision block 2137, back end 2011 determines whether user 2099 is authorized. If not (NO branch) the web UI displays an error at 2115. On the other hand, if the user is authorized (YES branch), at 2139, back end 2011 issues modify data command 2139 to the database 2003. In response, database 2003 attempts to modify its tables at 2141. In decision block 2143, back end 2011 determines whether the database update was successful. If not (NO branch), the web UI displays an error at 2115. On the other hand, if the table modification was successful (YES branch), at 2117, the web UI displays a success message at 2117.

Figure 12:
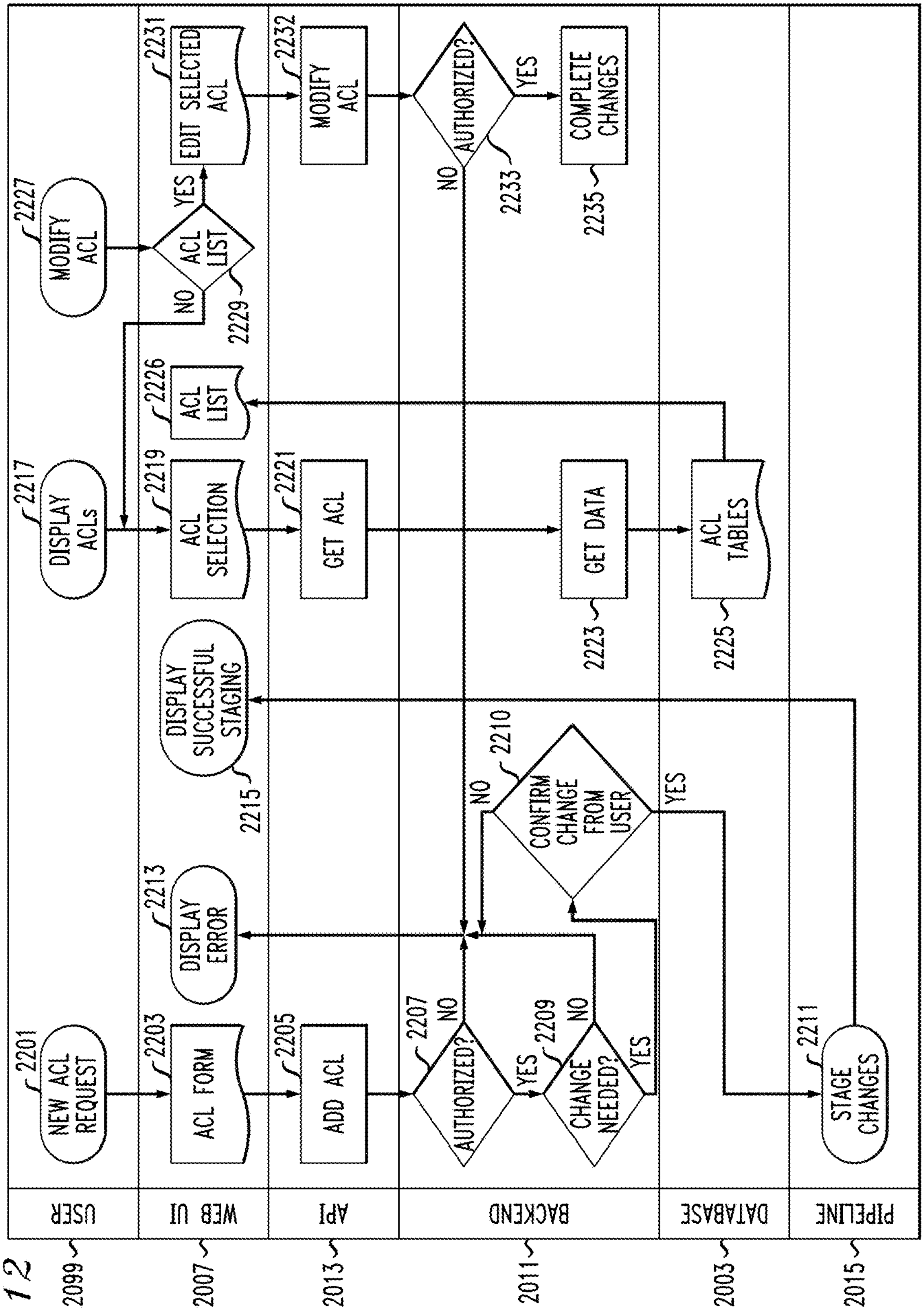
FIG. 12 shows a swim lane diagram for an ACL change, according to an aspect of the invention.

FIG. 12 shows a swim lane diagram for an ACL change, according to an aspect of the invention. At 2201, user 2099 initiates a request for a new ACL using the ACL form functionality 2203 of web UI 2007. Web UI 2007 employs API 2013 to request back end 2011 to add a new ACL at 2205. In decision block 2207, back end 2011 determines whether user 2099 is authorized. If not (NO branch) the web UI displays an error at 2213. On the other hand, if the user is authorized (YES branch), logical flow proceeds to decision block 2209 where back end 2011 determines whether the requested change is needed. If not (NO branch) the web UI displays an error at 2213. On the other hand, if the change is needed (YES branch), proceed to decision block 2210, wherein the user 2099 is asked to confirm the change is indeed desired. If YES, the pipeline 2015 stages the changes at 2211, and causes web UI 2007 to display a successful staging message at 2215. If NO, display an error at 2213.

At 2217, the user 2099 asks the web UI 2007 to display the current ACLs via ACL selection functionality 2219 of the web UI. At 2221, the ACL selection functionality 2221 of the web UI employs API 2013 to retrieve the ACLs for display. This causes back end 2011 to send a get data request 2223 to the database 2003. Database 2003 obtains the ACLs from memory at 2225 and the same is displayed by the web UI at 2226.

At 2227, the user 2099 asks the web UI 2007 to modify a current ACL. In decision block 2229, web UI 2007 determines whether the current ACL that has been requested to be modified is in the ACL list. If not (NO branch) logical flow proceeds to 2219 in the display ACL flow. On the other hand, if the current ACL that has been requested to be modified is in the ACL list (YES branch), at 2231, web UI 2007 allows user 2099 to edit the selected ACL. Web UI 2007 issues modify ACL command 2232 to the back end 2011 using API 2013. In decision block 2233, back end 2011 determines whether user 2099 is authorized. If not (NO branch) the web UI displays an error at 2213. On the other hand, if the user is authorized (YES branch), at 2235, pipeline 2015 stages the changes at 2211, and causes web UI 2007 to display a successful staging message at 2215.

Figure 13:
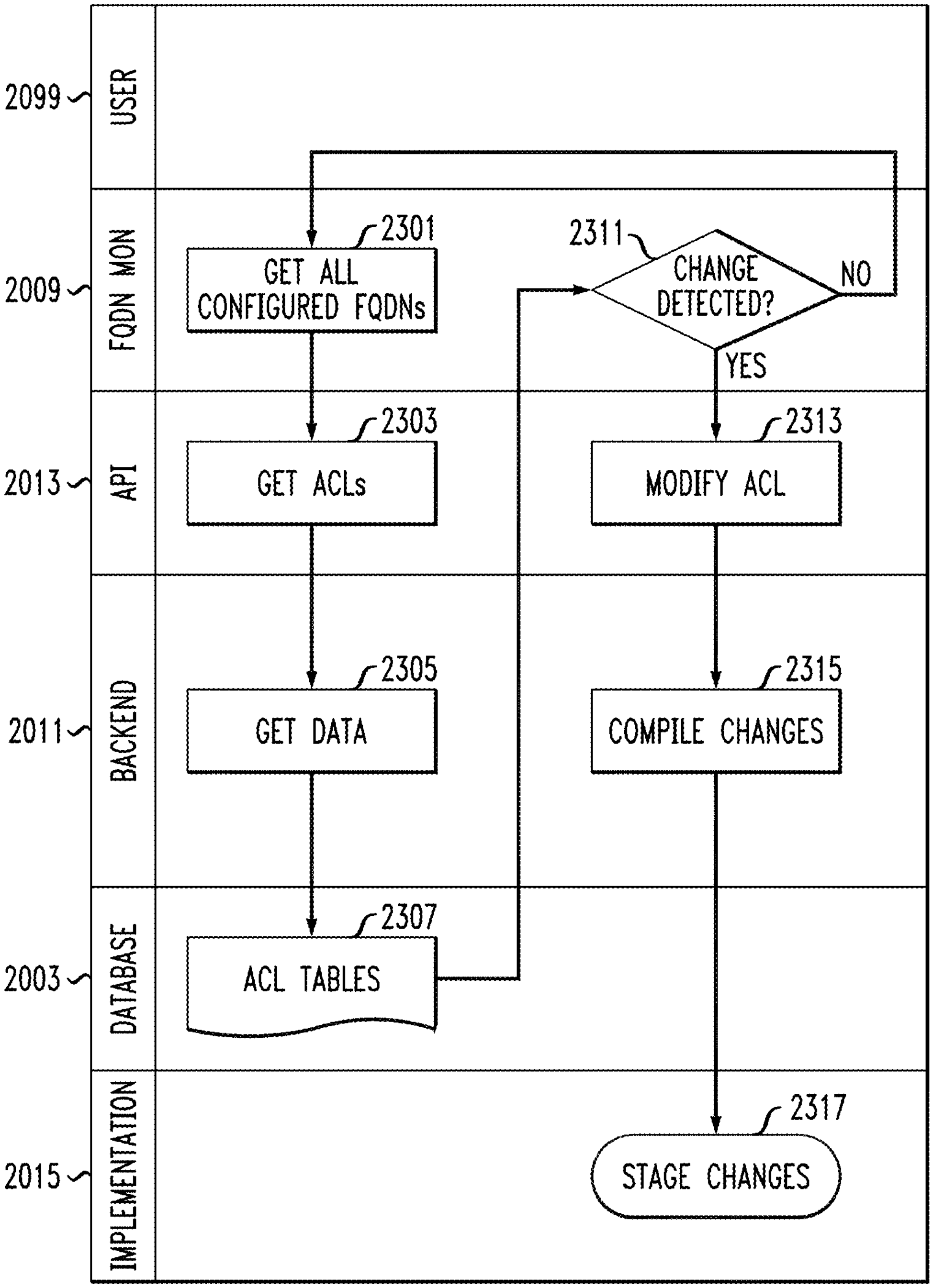
FIG. 13 shows a swim lane diagram for a fully qualified domain name (FQDN) monitor, according to an aspect of the invention.

FIG. 13 shows a swim lane diagram for a fully qualified domain name (FQDN) monitoring process, according to an aspect of the invention. In step 2301, FQDN monitor 2009 initiates a process to obtain all configured FQDNs from the database 2003. In particular, Get ACLs command 2303 is sent to back end 2011 from FQDN monitor 2009 via API 2013 and causes back end 2011 to use Get Data functionality 2305 to access the ACL tables 2307 in the database 2003. Decision block 2311 determines whether there has been any change. If not (NO branch), logical flow proceeds back to step 2301 and the monitoring process is repeated. On the other hand, if a change is detected (YES branch), at 2313, FQDN monitor 2009 issues modify ACL command 2313 to the back end 2011 via API 2013. At 2315, pipeline 2015 stages the changes at 2317.

FIG. 14 shows a swim lane diagram for an implementation pipeline/configuration process, according to an aspect of the invention. In decision block 2401, implementation pipeline 2015 determines whether there has been a change in the queue (queue changes are staged at 2211 and the implementation pipeline 2015 looks for changes in the queue at 2401). If not (NO branch), continue to check. If there has been a change (YES branch), notify the administrator in step 2403. As indicated by decision block 2405, if the administrator disapproves (NO branch), implementation pipeline 2015 notifies the user(s) at 2427. On the other hand, if the administrator does approve (YES branch), the job (corresponding to the queued configuration change request) is pulled from the queue in step 2407 and, at 2409, the configuration management block 2005 obtains the router information from the inventory tables 2411 of the database 2003. At 2413, the configuration management block 2005 builds the new configuration using the retrieved router information. In step 2415, the configuration management block 2005 pushes the new configuration to the router(s) 2001; the router(s) attempt to implement the configuration change at 2417. If this is not successful, as per the YES branch of decision block 2419 (YES as in yes, there is an error), implementation pipeline 2015 notifies the user(s) at 2427. On the other hand, if the configuration change is successful, as per the NO branch of decision block 2419 (NO as in no, there is not an error), in step 2421, implementation pipeline 2015 commits the change to version control and at step 2423 causes ACL table 2425 of database 2003 to be updated. In step 2427, the user(s) are notified. Regardless of how step 2427 is reached, following user notification, return back to decision block 2401 to continue checking for a change in the queue.

It is worth noting that optionally, within step 2407, the system can be configured to only pull the job from the queue during certain maintenance window(s). For example, there can be logic to check the clock and only pull jobs during certain times. It may be acceptable to make a change at 3 AM, but not during a busy daytime slot or other high-traffic time. In some cases, under control of appropriate logic with access to a clock signal, only pull jobs in certain time windows or push configs in certain time windows.

In a non-limiting example, database 2003 can be implemented with a commercially available SQL database. The backend 2011 and API 2013 can, for example, be custom written code that implements the logic described herein. In one or more non-limiting exemplary embodiments, the elements in FIG. 10, are included within the network of an MSO or under the control of an MSO. Note that the pipeline 2015 could be implemented on a server in the MSO's network or controlled by the MSO; however, it could also be controlled by a third party such as a web services entity. In such a case, for example, actions of the pipeline 2015 could be facilitated by commands sent to the third party (e.g., server, cloud) from the MSO.

Firewall Aspects

Figure 15:
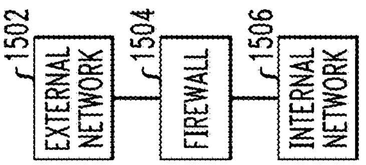
FIG. 15 shows a network-based firewall, according to an aspect of the invention.

In addition to routers and router access control lists, one or more embodiments can also be used to configure firewalls and firewall services on individual servers or the like. Referring to FIG. 15, a firewall 1504 can be interposed, for example, between an external/upstream network 1502 and an internal/downstream network 1506. For example, in FIG. 1, a firewall can be interposed between Internet 1002 and network 1046 (e.g., in association with router 1008); between elements upstream of a regional data center 1048 and downstream of a regional data center 1048 (e.g., in association with RR 1060); and/or between elements upstream of a head end 150 and downstream of a head end 150 (e.g., in association with HER 1091). Thus, embodiments are generally applicable for a communications network having a plurality of network security elements (e.g., routers, firewalls) and a plurality of network security element specification files (e.g., router access control lists or firewall configuration files) which limit packet flow on the network security elements. Some firewall configuration files are referred to as access control lists The example of FIG. 15 shows a network-based firewall. As will be appreciated by the skilled artisan, such firewalls can be implemented as a software appliance running on general-purpose hardware, a hardware appliance running on special-purpose hardware, or a virtual appliance running on a virtual host controlled by a hypervisor. One or more embodiments could also employ host-based firewalls, deployed directly on the host itself to control network traffic or the like.

The firewall configuration file could be a firewall access control list which specifies what packets will be examined and what action should be applied, if any. Packets may be filtered, for example, by source and destination IP addresses, protocol, source and destination ports, and the like. The firewall configuration file could include various types of data depending on the type of firewall; for example, specifying whether a process should accept any given connection; examining the process ID of data packets against a rule set for the local process involved in the data transmission; hooking into socket calls to filter the connections between the application layer and the lower layers; tables listing sources and destinations that are acceptable, those that are blocked, default rules; and so on.

Given the teachings herein, the skilled artisan can implement one or more embodiments using routers and ACLs as well as firewalls and firewall configuration files, for example, using techniques as illustrated and substituting firewalls and firewall configuration files for routers and ACLs in the diagrams.

Recapitulation

Given the discussion thus far, it will be appreciated that, in general terms, an exemplary method, according to an aspect of the invention, includes, for a communications network having a plurality of network security elements (e.g., routers 2001 or firewalls 1504) and a plurality of existing network security element specification files which limit packet flow on the network security elements, obtaining, from the user 2099, instructions to compose at least one of: a new network security element specification file; or one of the existing network security element specification files. As used herein, “composing” the network security element specification file includes setting up the file (e.g., ACL) ab initio and/or editing an existing file (e.g., ACL). As an aside, it is worth noting that one could have a network/routers with no ACLs/no security, just allowing anyone to communicate anywhere. In one or more embodiments, ACLs add a layer of security to permit packets to only flow from/to some IP addresses. As used herein, “at least one of: a new network security element specification file; or one of the existing network security element specification files” means one or more new network security element specification files OR one or more of the existing network security element specification files OR one or more new network security element specification files AND one or more of the existing network security element specification files. The new network security element specification file typically also limits packet flow on one or more of the network security elements.

An optional further step includes inventorying the plurality of network security elements and the plurality of network security element specification files in a database 2003. As used herein, “inventorying” the routers includes building the database ab initio and/or updating the existing database. For example, as seen in FIG. 11 at 2101, user 2099 uses inventory form 2103 of web UI 2007 to access backend 2011 via add router message 2105 of API 2013. In the example of FIG. 11, if the authorization test is passed at 2107, back end 2011 issues store data command 2109 to database 2003 which updates the tables at 2111.

In one or more embodiments, the plurality of network security elements comprise a plurality of routers, the plurality of network security element specification files comprise a plurality of router access control lists, and the at least one corresponding network security element of the plurality of network security elements comprises at least one corresponding router of the plurality of routers. However, as also noted, in some cases, the plurality of network security elements comprise a plurality of firewalls, the plurality of network security element specification files comprise a plurality of firewall configuration files, and the at least one corresponding network security element of the plurality of network security elements comprises at least one corresponding firewall of the plurality of firewalls.

Still referring to FIG. 12, a still further step includes facilitating queuing a configuration change request that implements the instructions in an implementation pipeline. In the example of FIG. 12, user 2099 uses ACL form 2203 of web UI 2007 to request a new ACL, as seen at 2201. Web UI communicates this to back end 2011 using add ACL message 2205 of the API. The back end 2011 determines whether the request is authorized at block 2207, and if so, at 2209, whether the change is needed. If yes, proceed to decision block 2210, wherein the user 2099 is asked to confirm the change is indeed desired. If YES, the pipeline 2015 stages the changes at 2211, and causes web UI 2007 to display a successful staging message at 2215. If NO in the decision block(s), display an error at 2213.

Referring to FIG. 14 step 2415, an even further step includes facilitating pushing the configuration change request to at least one corresponding network security element of the plurality of network security elements. In the example of FIG. 14, pipeline 2015 detects a change in the queue at 2401 and upon approval, pulls the job from the queue at 2407 and causes the config management process 2005 to push the config to the router 2001 at 2415 (refer to descriptions of steps/elements 2409, 2411, 2413 elsewhere herein).

One or more embodiments further include updating the database 2003 to reflect the configuration change request; and memorializing the configuration change request in a configuration management system 2005. For example, in FIG. 14, note the commit to version control step 2421 and the update database step 2423 of implementation pipeline 2015 which causes database 2003 to update the ACL tables at 2425. Note also the build config step 2413.

One or more embodiments further include assigning a unique name to each of the plurality of access control lists, such that each of the plurality of access control lists is identified in the database 2003 by the assigned unique name. This can be done, for example, based on instructions from a human operator.

Some embodiments further include employing a given one of the access control lists on at least two routers of the plurality of routers 2001.

One or more embodiments further include, prior to queuing the configuration change request that implements the instructions, displaying changes resulting from the instructions to the user; and obtaining, from the user, verification to proceed with the displayed changes. For example, referring to FIG. 12, user 2099 requests an ACL change. After the YES outlet of decision block 2209, within back end 2011, the back end goes back to the user 2099 and essentially asks “Are you sure?” This is indicated in decision block 2210, “Confirm change from user.” If NO, display an error at 2213; if YES continue to 2211. By way of review, refer, for example, to the discussion above regarding setting up a UI so that users can login and be granted appropriate permissions, and once the user has the appropriate permissions, the user will be able to view or edit any ACL the user has permissions for. When the edits are completed, the user reviews how the proposed changes are different from the currently deployed rules, and asked is asked if it is desired to continue with the new changes. Once the changes are accepted (YES branch of 2210), the change request is put into the implementation pipeline, at 2211, for implementation on the router(s) that the ACL resides on.”

One or more embodiments further include operating the communications network having the plurality of routers 2001 and the plurality of access control lists in accordance with the pushed configuration change request. For example, this aspect results in a network operation that is more secure than if no ACLs were used, and can deal with the high bandwidth associated with video by using ACLs instead of firewalls. Indeed, in one or more embodiments, the operating of the network includes blocking inbound traffic on at least one port of the at least one corresponding router 2001 in accordance with the pushed configuration change request. As noted, one or more such embodiments are particularly useful for video because the use of ACLs instead of firewalls is appropriate due to video being very high bandwidth (e.g., 15 Mbps per channel). For example, in a modern video content network with 6000-7000 live stream channels, 15 Mbps multiplied by 6000 channels, result in a massive amount of bandwidth (90,000 Mbps or 90 Gbps). It is not believed that any firewall or combination of firewalls can handle that amount of bandwidth. Therefore, in one more embodiments, a video content network uses ACLs built into routers 2001. A port can be blocked, for example, because a bad actor is trying to inject malicious code, carry out a denial of service (DOS) attack such as a distributed denial of service (DDOS) attack, etc.

In some instances, the communications network includes a video content network and the operating of the network includes carrying at least 10 Gbps of video content, without the use of firewalls. It is worth noting that in one or more embodiments, this video is carried using IP streaming or SDPA (Service Delivery Platform Architecture) as opposed to traditional dedicated HFC video QAMS (QAM could be used a modulation scheme, however, if desired). It is worth noting that ACLS can be used for any type of traffic, not limited to video traffic, but firewalls (which are unsuitable for video) may be preferable to ACLs when they can be used. In some instances, the communications network includes a video content network and the operating of the network includes carrying at least 50 Gbps of video content, without the use of firewalls. In some instances, the communications network includes a video content network and the operating of the network includes carrying at least 90 Gbps of video content, without the use of firewalls.

In some cases, the configuration change request is pushed automatically. Refer, for example, to FIG. 14 and consider an aspect where steps 2403, 2405 are bypassed and when a change in the queue is detected at 2401, the job is automatically pulled from the queue at 2407. On the other hand, in some cases, steps 2403, 2405 are implemented, and the configuration change request is pushed responsive to approval by an administrator.

In some cases, the configuration change request is pushed responsive to a daemon detecting a change in a configuration change request queue (see, e.g., FIG. 14 decision block 2401); daemon-like functionality in implementation pipeline 2015 continuously checks for a change.

In one or more embodiments, the plurality of access control lists limit the packet flow on the routers based on internet protocol addresses. Referring to the discussion of the FQDN monitor 2009, in one or more embodiments, in the step of obtaining, from the user, the instructions to compose one of the access control lists, the instructions specify rules based on at least one fully qualified domain name, and a further step includes translating the at least one fully qualified domain name into at least one corresponding internet protocol address, used by at least one of the plurality of access control lists to limit the packet flow on the routers. Thus, with regard to the FQDN monitor 2009, normally, the ACLS specify access based on IP address, and the FQDN keeps a record of all the IP addresses associated with an FQDN, since they change over time. This allows the specification of a control based on FQDN instead of IP, but the FQDN is translated into the IP address(es) before deploying to the routers. Typically, an ACL uses an IP Address, since routers typically cannot identify by FQDN. Often, when a connection is made to a server on the Internet, only the FQDN and not the IP address is known; the FQDN monitor 2009 is helpful, for example, in this scenario. The FQDN monitor module can employ, for example, a tabular data structure listing IP addresses in association with FQDNs.

It is worth noting that checking for authorization can be done using known AAA (Authentication, Authorization and Accounting) techniques.

In another aspect, the pipeline 2015 can also determine time windows when configuration changes are allowed on the system. Refer to the discussion of block 2407, for example.

In another aspect, an exemplary system (e.g., backend 2011 and optionally any one or more of the other components illustrated in FIG. 10) includes a memory 730; and at least one processor 720, coupled to the memory, and operative to carry out or otherwise facilitate any one, some, or all of the method steps described herein.

In another aspect, an exemplary system includes a communications network having a plurality of network security elements (e.g., routers 2001 or firewalls 1504) and a plurality of existing network security element specification files which limit packet flow on the network security elements; and a backend 2011 coupled to the plurality of network security elements (e.g., through the config management 2005 and/or implementation pipeline 2015). The backend is configured to obtain, from a user, instructions to compose at least one of: a new network security element specification file; or one of the existing network security element specification files; and to facilitate queuing a configuration change request that implements the instructions in an implementation pipeline, to cause the configuration change request to be pushed to at least one corresponding network security element of the plurality of network security elements.

One or more embodiments further include a database 2003 coupled to the backend; the backend is configured to inventory the plurality of network security elements and the plurality of existing network security element specification files in the database.

As noted above, in one or more embodiments, the plurality of network security elements comprise a plurality of routers, the plurality of network security element specification files comprise a plurality of router access control lists, and the at least one corresponding network security element of the plurality of network security elements comprises at least one corresponding router of the plurality of routers. However, as also noted above, in some cases, the plurality of network security elements comprise a plurality of firewalls, the plurality of network security element specification files comprise a plurality of firewall configuration files, and the at least one corresponding network security element of the plurality of network security elements comprises at least one corresponding firewall of the plurality of firewalls.

In one or more embodiments, a given one of the access control lists is employed on at least two routers of the plurality of routers.

In one or more embodiments, at least one of the routers is configured to block inbound traffic on at least one port in accordance with the pushed configuration change request.

In at least some cases, the communications network is a video content network that carries at least 10 Gbps of video content, without the use of firewalls. In some instances, the communications network includes a video content network and the operating of the network includes carrying at least 50 Gbps of video content, without the use of firewalls. In some instances, the communications network includes a video content network and the operating of the network includes carrying at least 90 Gbps of video content, without the use of firewalls.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine-readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system, to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass transmission media per se or disembodied signals per se. Appropriate interconnections via bus, network, and the like can also be included.

Figure 7:
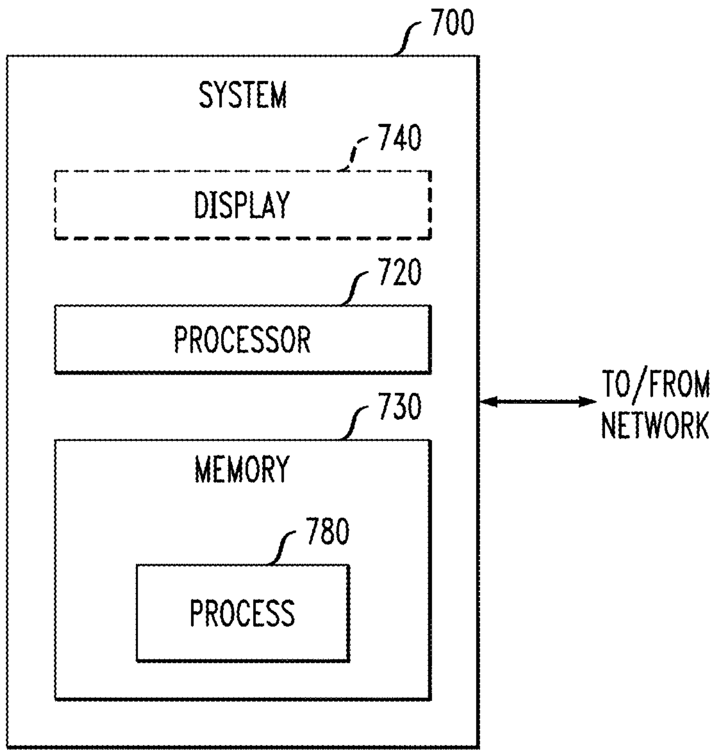
FIG. 7 is a block diagram of a computer system useful in connection with one or more aspects of the invention.

FIG. 7 is a block diagram of at least a portion of an exemplary system 700 that can be configured to implement at least some aspects of the invention, and is representative, for example, of one or more of the apparatus or modules shown in the figures. As shown in FIG. 7, memory 730 configures the processor 720 to implement one or more methods, steps, and functions (collectively, shown as process 780 in FIG. 7). The memory 730 could be distributed or local and the processor 720 could be distributed or singular. Different steps could be carried out by different processors, either concurrently (i.e., in parallel) or sequentially (i.e., in series).

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC rather than using firmware. Display 740 is representative of a variety of possible input/output devices (e.g., keyboards, mice, and the like). Every processor may not have a display, keyboard, mouse or the like associated with it.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, and that such program may be embodied on a tangible computer readable recordable storage medium. As used herein, including the claims, unless it is unambiguously apparent from the context that only server software is being referred to, a "server" includes a physical data processing system running a server program. It will be understood that such a physical server may or may not include a display, keyboard, or other input/output components. Furthermore, as used herein, including the claims, a "router" includes a networking device with both software and hardware tailored to the tasks of routing and forwarding information. Note that servers and routers can be virtualized instead of being physical devices (although there is still underlying hardware in the case of virtualization).

Furthermore, it should be noted that any of the methods described herein can include an additional step of providing a system comprising distinct software modules or components embodied on one or more tangible computer readable storage media. All the modules (or any subset thereof) can be on the same medium, or each can be on a different medium, for example. The modules can include any or all of the components shown in the figures. The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:

for a communications network having a plurality of network security elements and a plurality of existing network security element specification files which limit packet flow on the network security elements, obtaining, from a user, instructions to compose at least one of:

a new network security element specification file; or one of the existing network security element specification files;

facilitating generating a configuration change request by translating at least one fully qualified domain name into at least one corresponding internet protocol address for inclusion in the configuration change request;

facilitating queuing the configuration change request that implements the instructions in an implementation pipeline;

facilitating recording the configuration change request into a version control mechanism;

facilitating pushing the configuration change request to at least one corresponding network security element of the plurality of network security elements; and facilitating rolling back the configuration change request based on the version control mechanism in response to a detection of a failure associated with the configuration change request.

2. The method of claim 1, further comprising inventorying the plurality of network security elements and the plurality of existing network security element specification files in a database.

3. The method of claim 2, wherein the plurality of network security elements comprise a plurality of routers, the plurality of network security element specification files comprise a plurality of router access control lists, and the at least one corresponding network security element of the plurality of network security elements comprises at least one corresponding router of the plurality of routers.

4. The method of claim 3, further comprising:

updating the database to reflect the configuration change request; and memorializing the configuration change request in a configuration management system.

5. The method of claim 4, further comprising assigning a unique name to each of the plurality of router access control lists, wherein each of the plurality of router access control lists is identified in the database by the assigned unique name.

6. The method of claim 5, further comprising employing a given one of the router access control lists on at least two routers of the plurality of routers.

7. The method of claim 4, further comprising, prior to queuing the configuration change request that implements the instructions:

displaying changes resulting from the instructions to the user; and obtaining, from the user, verification to proceed with the displayed changes.

8. The method of claim 4, further comprising operating the communications network having the plurality of routers and the plurality of router access control lists in accordance with the pushed configuration change request.

9. The method of claim 8, wherein the operating includes blocking inbound traffic on at least one port of the at least one corresponding router in accordance with the pushed configuration change request.

10. The method of claim 8, wherein the communications network comprises a video content network and wherein the operating of the network includes carrying at least 10 Gbps of video content, without the use of firewalls.

11. The method of claim 4, wherein the configuration change request is pushed automatically.

12. The method of claim 4, wherein the configuration change request is pushed responsive to approval by an administrator.

13. The method of claim 4, wherein the configuration change request is pushed responsive to a daemon detecting a change in a configuration change request queue.

14. The method of claim 3, wherein:

the plurality of router access control lists limit the packet flow on the routers based on given internet protocol addresses; and in the step of obtaining, from the user, the instructions to compose one of the router access control lists, the instructions specify rules based on the at least one fully qualified domain name.

15. The method of claim 2, wherein the plurality of network security elements comprise a plurality of firewalls, the plurality of network security element specification files comprise a plurality of firewall configuration files, and the at least one corresponding network security element of the plurality of network security elements comprises at least one corresponding firewall of the plurality of firewalls.

16. A non-transitory computer readable medium comprising computer executable instructions which when executed by a computer cause the computer to perform a method comprising:

for a communications network having a plurality of network security elements and a plurality of existing network security element specification files which limit packet flow on the network security elements, obtaining, from a user, instructions to compose at least one of:

a new network security element specification file; or one of the existing network security element specification files;

facilitating generating a configuration change request by translating at least one fully qualified domain name into at least one corresponding internet protocol address for inclusion in the configuration change request;

facilitating queuing the configuration change request that implements the instructions in an implementation pipeline;

facilitating recording the configuration change request into a version control mechanism;

facilitating pushing the configuration change request to at least one corresponding network security element of the plurality of network security elements; and facilitating rolling back the configuration change request based on the version control mechanism in response to a detection of a failure associated with the configuration change request.

17. A system comprising:

a memory; and at least one processor, coupled to the memory, and operative to:

for a communications network having a plurality of network security elements and a plurality of existing network security element specification files which limit packet flow on the network security elements, obtain, from a user, instructions to compose at least one of:

a new network security element specification file; or one of the existing network security element specification files;

facilitate generating a configuration change request by translating at least one fully qualified domain name into at least one corresponding internet protocol address for inclusion in the configuration change request;

facilitate queuing the configuration change request that implements the instructions in an implementation pipeline;

facilitate recording the configuration change request into a version control mechanism;

facilitate pushing the configuration change request to at least one corresponding network security element of the plurality of network security elements; and facilitate rolling back the configuration change request based on the version control mechanism in response to a detection of a failure associated with the configuration change request.

18. The system of claim 17, wherein the at least one processor is further operative to inventory the plurality of network security elements and the plurality of existing network security element specification files in a database.

19. The system of claim 18, wherein the plurality of network security elements comprise a plurality of routers, the plurality of network security element specification files comprise a plurality of router access control lists, and the at least one corresponding network security element of the plurality of network security elements comprises at least one corresponding router of the plurality of routers.

20. The system of claim 19, wherein the at least one processor is further operative to:

update the database to reflect the configuration change request; and memorialize the configuration change request in a configuration management system.

21. The system of claim 20, wherein the at least one processor is further operative to assign a unique name to each of the plurality of access control lists, wherein each of the plurality of access control lists is identified in the database by the assigned unique name.

22. The system of claim 21, wherein the at least one processor is further operative to employ a given one of the access control lists on at least two routers of the plurality of routers.

23. The system of claim 20, wherein the at least one processor is further operative to facilitate operating the communications network having the plurality of routers and the plurality of access control lists in accordance with the pushed configuration change request.

24. The system of claim 23, wherein the operating includes blocking inbound traffic on at least one port of the at least one corresponding router in accordance with the pushed configuration change request.

25. The system of claim 23, wherein the communications network comprises a video content network and wherein the operating of the network includes carrying at least 10 Gbps of video content, without the use of firewalls.

26. The system of claim 18, wherein the plurality of network security elements comprise a plurality of firewalls, the plurality of network security element specification files comprise a plurality of firewall configuration files, and the at least one corresponding network security element of the plurality of network security elements comprises at least one corresponding firewall of the plurality of firewalls.

27. A system comprising:

a communications network having a plurality of network security elements and a plurality of existing network security element specification files which limit packet flow on the network security elements; and a backend coupled to the plurality of network security elements;

wherein:

the backend is configured to obtain, from a user, instructions to compose at least one of:

a new network security element specification file; or one of the existing network security element specification files; and the backend is configured to facilitate generating a configuration change request by translating at least one fully qualified domain name into at least one corresponding internet protocol address for inclusion in the configuration change request; facilitate recording the configuration change request into a version control mechanism, facilitate queuing the configuration change request that implements the instructions in an implementation pipeline, to cause the configuration change request to be pushed to at least one corresponding network security element of the plurality of network security elements, and facilitate rolling back the configuration change request based on the version control mechanism in response to a detection of a failure associated with the configuration change request.

28. The system of claim 27, further comprising a database coupled to the backend, wherein the backend is configured to inventory the plurality of network security elements and the plurality of existing network security element specification files in the database.

29. The system of claim 28, wherein the plurality of network security elements comprise a plurality of routers, the plurality of network security element specification files comprise a plurality of router access control lists, and the at least one corresponding network security element of the plurality of network security elements comprises at least one corresponding router of the plurality of routers.

30. The system of claim 29, wherein a given one of the access control lists is employed on at least two routers of the plurality of routers.

31. The system of claim 30, wherein at least one of the routers is configured to block inbound traffic on at least one port in accordance with the pushed configuration change request.

32. The system of claim 30, wherein the communications network comprises a video content network that carries at least 10 Gbps of video content, without the use of firewalls.

33. The system of claim 28, wherein the plurality of network security elements comprise a plurality of firewalls, the plurality of network security element specification files comprise a plurality of firewall configuration files, and the at least one corresponding network security element of the plurality of network security elements comprises at least one corresponding firewall of the plurality of firewalls.

34. A method comprising:

for a communications network having a plurality of network security elements and a plurality of existing network security element specification files which limit packet flow on the network security elements, obtaining, from a user, instructions to compose at least one of:

a new network security element specification file; or one of the existing network security element specification files;

facilitating queuing a configuration change request that implements the instructions in an implementation pipeline;

facilitating pushing the configuration change request to at least one corresponding network security element of the plurality of network security elements;

wherein the plurality of network security elements comprise a plurality of routers, the plurality of network security element specification files comprise a plurality of router access control lists, the at least one corresponding network security element of the plurality of network security elements comprises at least one corresponding router of the plurality of routers, wherein the communications network comprises a video content network, and wherein the operating of the network includes carrying at least 10 Gbps of video content, without the use of firewalls;

further comprising operating the communications network having the plurality of routers and the plurality of router access control lists in accordance with the pushed configuration change request.

* * * * *